United States Patent
Chong et al.

(10) Patent No.: US 12,513,544 B2
(45) Date of Patent: Dec. 30, 2025

(54) USER EQUIPMENT FOR MEASURING AN INTERFERENCE SIGNAL AND REPORTING A MEASUREMENT RESULT TO A BASE STATION, A WIRELESS COMMUNICATION SYSTEM INCLUDING THE SAME, AND AN OPERATION METHOD OF THE SAME

(71) Applicant: SAMSUNG ELECTRONICS CO., LTD., Suwon-si (KR)

(72) Inventors: Dahae Chong, Seongnam-si (KR); Gunyoung Ko, Seoul (KR); Haechul Lee, Yongin-si (KR); Keol Cho, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 471 days.

(21) Appl. No.: 17/981,054

(22) Filed: Nov. 4, 2022

(65) Prior Publication Data

US 2023/0188231 A1    Jun. 15, 2023

(30) Foreign Application Priority Data

Dec. 13, 2021    (KR) .................. 10-2021-0178029

(51) Int. Cl.
*H04B 17/20*    (2015.01)
*H04B 17/345*    (2015.01)
(Continued)

(52) U.S. Cl.
CPC .......... *H04W 24/08* (2013.01); *H04B 17/254* (2023.05); *H04B 17/345* (2015.01); *H04W 24/10* (2013.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
CPC .... H04B 17/0082–3913; H04J 11/0023–0066; H04L 5/0001–0098; H04W 24/02–10; H04W 72/02–569; H04W 84/02–16; H04W 88/02–12; H04W 92/02–24
See application file for complete search history.

(56) References Cited

U.S. PATENT DOCUMENTS 10,477,420 B2    11/2019    Ghosh et al.
10,772,054 B2    9/2020    Jung et al.
(Continued)

FOREIGN PATENT DOCUMENTS

JP    2000-252870    9/2000

*Primary Examiner* — Timothy J Weidner
(74) *Attorney, Agent, or Firm* — Morgan, Lewis & Bockius LLP

(57) ABSTRACT

User equipment for communicating with a first base station, the user equipment including: a radio frequency (RF) transceiver; a processing circuit configured to process a signal received through the RF transceiver or a signal to be transmitted through the RF transceiver; and a controller configured to determine a first reception timing of a first interference signal, and measure a second interference signal that is received after the first interference signal based on the first reception timing, wherein the first interference signal and the second interference signal are received from adjacent user equipment communicating with a second base station.

14 Claims, 25 Drawing Sheets

(51) Int. Cl.
*H04W 24/08* (2009.01)
*H04W 24/10* (2009.01)
*H04W 84/02* (2009.01)
*H04W 88/02* (2009.01)
*H04W 88/08* (2009.01)
*H04W 92/02* (2009.01)
*H04W 92/10* (2009.01)
*H04W 92/18* (2009.01)

(56) References Cited

U.S. PATENT DOCUMENTS

| | | | |
|---|---|---|---|
| 10,805,925 | B1 | 10/2020 | Hwang et al. |
| 10,924,959 | B2 | 2/2021 | Zhu et al. |
| 11,070,302 | B2 | 7/2021 | Kang et al. |
| 2019/0260486 | A1* | 8/2019 | Kang .................... H04W 24/10 |
| 2021/0144574 | A1* | 5/2021 | Jin ........................ H04W 24/10 |
| 2023/0216643 | A1* | 7/2023 | Li ..................... H04W 72/0446 |

\* cited by examiner

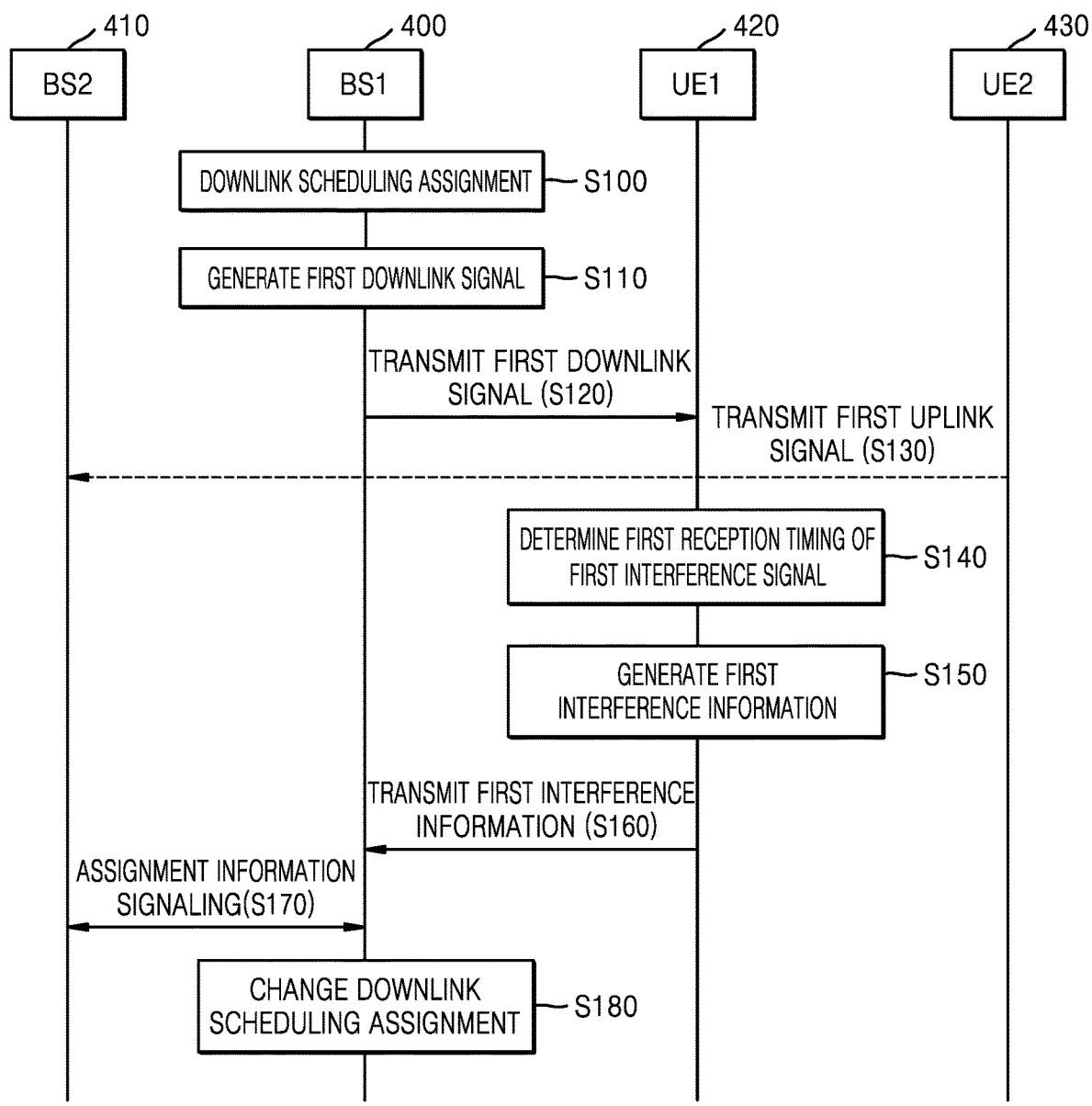

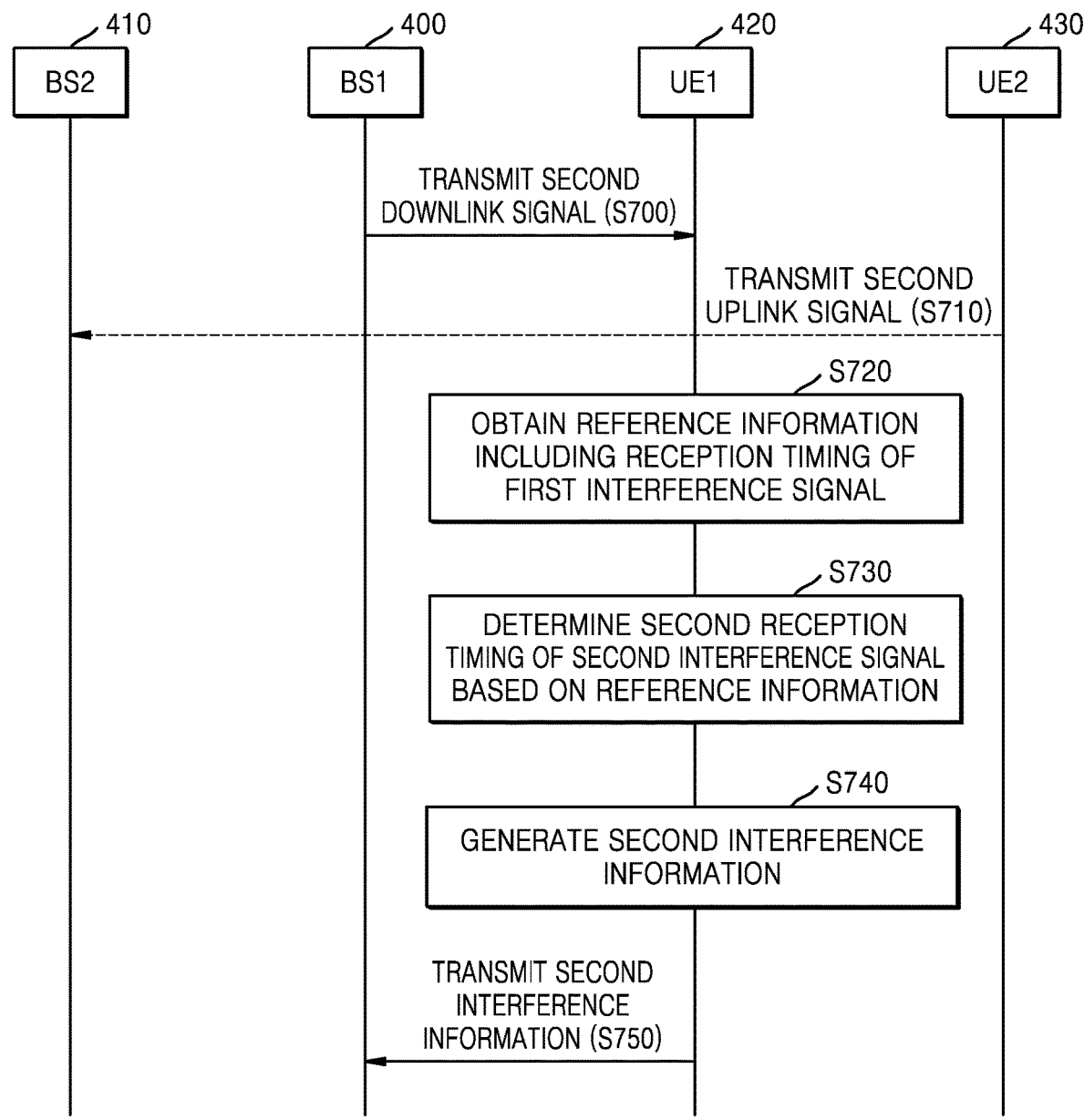

USER EQUIPMENT FOR MEASURING AN INTERFERENCE SIGNAL AND REPORTING A MEASUREMENT RESULT TO A BASE STATION, A WIRELESS COMMUNICATION SYSTEM INCLUDING THE SAME, AND AN OPERATION METHOD OF THE SAME

CROSS-REFERENCE TO RELATED APPLICATION

This application claims priority under 35 U.S.C. § 119 to Korean Patent Application No. 10-2021-0178029, filed on Dec. 13, 2021, in the Korean Intellectual Property Office, the disclosure of which is incorporated by reference herein in its entirety.

TECHNICAL FIELD

The inventive concept relates to wireless communication, and more particularly, to user equipment which measures an interference signal and reports the measurement to a base station, a wireless communication system including the user equipment, and an operation method of the user equipment.

DISCUSSION OF RELATED ART

As communication technology continues to develop, high-speed wireless communication through a high-frequency band, such as millimeter waves, is being employed. However, the high-speed wireless communication may be exposed to peripheral interferences that can degrade a throughput of a wireless communication network.

Recently, according to Release 16 of the 3$^{rd}$ Generation Partnership Project (3GPP), a technique, in which each of a plurality of base stations performs a downlink scheduling assignment with respect to user equipment within its own coverage area while considering cross-link interference among coverage areas of adjacent base stations, has been suggested.

SUMMARY

The inventive concept provides user equipment capable of precisely and effectively measuring an interference signal from adjacent user equipment and providing a measurement result to a base station so that the base station may perform a downlink scheduling assignment for minimizing interference, a wireless communication system including the user equipment, and an operation method of the user equipment.

According to an embodiment of the present inventive concept, there is provided user equipment for communicating with a first base station, the user equipment including: a radio frequency (RF) transceiver; a processing circuit configured to process a signal received through the RF transceiver or a signal to be transmitted through the RF transceiver; and a controller configured to determine a first reception timing of a first interference signal, and measure a second interference signal that is received after the first interference signal based on the first reception timing, wherein the first interference signal and the second interference signal are received from adjacent user equipment communicating with a second base station.

According to an embodiment of the present inventive concept, there is provided a wireless communication system including: a first base station; and user equipment communicating with the first base station, wherein the user equipment is configured to determine a first reception timing and a first representative indicator value of a first interference signal received from adjacent user equipment communicating with a second base station in a first timing detection period, and transmit first interference information to the first base station, the first interference information including the first reception timing or the first representative indicator value, the first timing detection period being one of a plurality of periods of receiving a first downlink signal in a first assignment method.

According to an embodiment of the present inventive concept, there is provided an operation method of user equipment communicating with a base station, the operation method including: receiving a downlink signal from the base station and a first interference signal from nearby user equipment; dividing a timing detection period into a plurality of timing candidates; measuring an indicator value of the first interference signal at each of the plurality of timing candidates; determining a first reception timing of the first interference signal based on the measured indicator values; and storing the first reception timing as reference information, wherein the reception information is to be used to determine a second reception timing of a second interference signal that is to be received later.

BRIEF DESCRIPTION OF THE DRAWINGS

Embodiments of the inventive concept will be more clearly understood from the following detailed description taken in conjunction with the accompanying drawings in which:

FIG. 4 is a flowchart for describing a method of operating a wireless communication system according to an embodiment of the present inventive concept;

FIG. 15A is a flowchart for describing a method of operating first user equipment according to an embodiment of the present inventive concept;

DETAILED DESCRIPTION OF THE EMBODIMENTS

Figure 1:
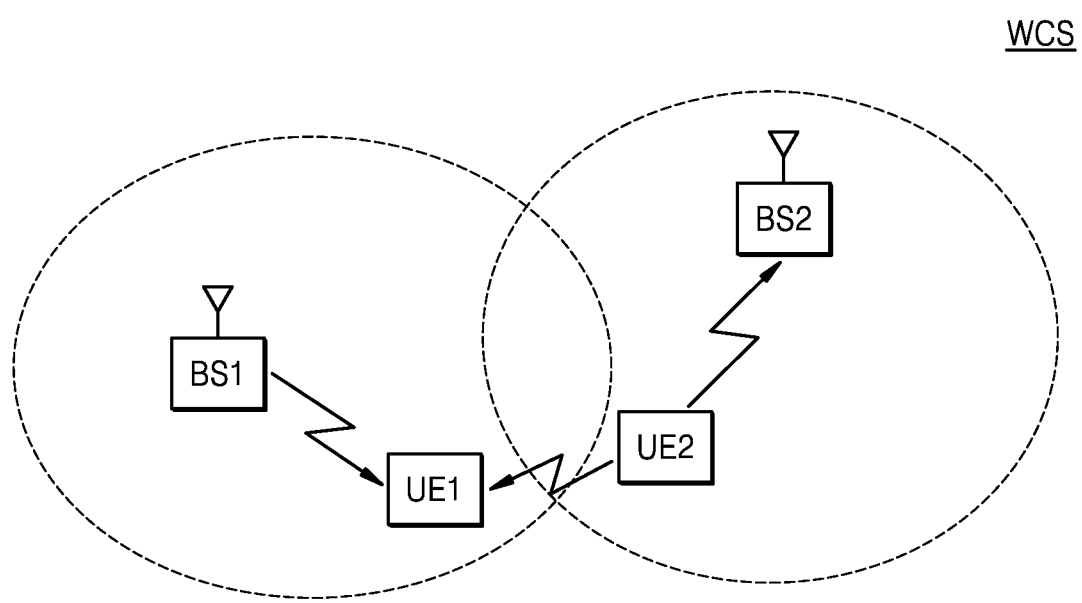
FIG. 1 is a block diagram of a wireless communication system according to an embodiment of the inventive concept.

FIG. 1 is a block diagram of a wireless communication system WCS according to an embodiment of the inventive concept. FIG. 1 briefly shows a wireless communication system WCS for describing an embodiment of the inventive concept; however, the inventive concept is not limited thereto.

Hereinafter, a first base station BS1 and a second base station BS2 may denote fixed stations communicating with user equipment and/or other base stations. For example, the first base station BS1 and the second base station BS2 may exchange data and control information by communicating with first user equipment UE1 and second user equipment UE2 and/or other base stations. For example, the first and second base stations BS1 and BS2 may each be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, a device, etc. In the present specification, a base station or a cell is a generic term including some areas or functions covered by a base station controller (BSC) in code division multiple access (CDMA), a Node-B in wideband CDMA (WCDMA), an eNB or a sector (site) in long-term evolution (LTE), etc., and all of various coverage areas, such as a megacell, a macrocell, a microcell, a picocell, a femtocell and a relay node, remote radio head (RRH), RU, a small cell communication range, etc.

The first user equipment UE1 and the second user equipment UE2 may denote arbitrary devices that are fixed or movable and transmit/receive data and/or control information by communicating with one of the first and second base stations BS1 and BS2. For example, the first user equipment UE1 and the second user equipment UE2 may be each referred to as a terminal, a terminal equipment, a mobile station (MS), a mobile terminal (MT), a user terminal (UT), a subscriber station (SS), a wireless communication device, a wireless device, a handheld device, etc.

Referring to FIG. 1, the wireless communication system WCS may include the first and second base stations BS1 and BS2. The first base station BS1 may provide wireless broadband access to the first user equipment UE1 in the coverage area of the first base station BS1. The coverage area of the first base station BS1 may be denoted by the dashed circle surrounding the first base station BS1. The second base station BS2 may provide wireless broadband access to the second user equipment UE2 in the coverage area of the second base station BS2. The coverage area of the second base station BS2 may be denoted by the dashed circle surrounding the second base station BS2. In an example embodiment of the inventive concept, the first and second base stations BS1 and BS2 may communicate with each other or with the first user equipment UE1 and the second user equipment UE2 via new radio (NR), LTE, LTE-advanced (LTE-A), world interoperability for microwave access (WiMAX), wireless fidelity (WiFi), CDMA, global system for mobile communication (GSM), wireless local area network (WLAN), or other wireless communication techniques. The technical idea of the inventive concept may be applied to cases where the first and second base stations BS1 and BS2 use the same or different wireless communication techniques. In addition, the present specification describes configurations and operations of the first base station BS1 and the first user equipment UE1 according to an NR network to which the technical idea of the inventive concept is applied, but one or more embodiments of the inventive concept are not limited thereto. The technical idea of the present inventive concept may be also applied to the second base station BS2 and the second user equipment UE2. The technical idea of the inventive concept may comply with the $3^{rd}$ generation partnership project (3GPP) standard specification and one or more embodiments of the inventive concept may comply with the 3GPP standard specification.

The first base station BS1 may perform a downlink scheduling assignment with respect to the first user equipment UE1. For example, the first base station BS1 may generate mapping information, downlink control information, etc. about the resource for transferring a first downlink signal to the first user equipment UE1 and may provide the first user equipment UE1 with the above information via a control channel. After that, the first base station BS1 may transfer the first downlink signal based on the downlink scheduling assignment to the first user equipment UE1, and the first user equipment UE1 may receive the first downlink signal by using the information provided through the control channel.

In addition, the second user equipment UE2 may perform communication with the second base station BS2 and may transfer a first uplink signal to the second base station BS2. The second user equipment UE2 may be adjacent to the first user equipment UE1, and the first user equipment UE1 may unintentionally receive the first uplink signal from the second user equipment UE2. Accordingly, the first uplink signal of the second user equipment UE2 may correspond to a first interference signal with respect to the first downlink signal received by the first user equipment UE1. In other words, the first uplink signal of the second user equipment UE2 may interfere with a signal received by the first user equipment UE1. In the present specification, the interference signal may be referred to as cross link interference. In addition, the interference signal may encompasses various signals of the second user equipment UE2, which interfere with the receiving of the first downlink signal at the first user equipment UE1 side.

In an embodiment of the inventive concept, the first user equipment UE1 may generate a certain number of measurement results by measuring the first interference signal received from the second user equipment UE2 and may determine a first reception timing of the first interference signal from the measurement results. In addition, the first user equipment UE1 may generate first interference information from the measurement results and transfer the first interference information to the first base station BS1. In the present specification, the interference information may include information appointed between the base station and the user equipment so that the base station (e.g., the first base station BS1) may identify the influence of the interference signal from user equipment (e.g., the second user equipment UE2) that is adjacent to the user equipment (e.g., the first user equipment UE1) within its own coverage area. In an embodiment of the inventive concept, the interference information may include at least one indicator value from among various indicators representing an intensity (or magnitude) of the interference signal, and moreover, may further include a reception timing of the interference signal determined by the user equipment. In an example embodiment of the inventive concept, the above indicator may include at least one of reference signal received power, a received signal strength indicator, and reference signal received quality. However, the above is an example, and the inventive concept is not limited thereto. In other words, the indicator may be based on various calculation methods that may indicate the intensity (or magnitude) of the interference signal. In the present specification, the indicator may be referred to as a wireless environment indicator.

In an embodiment of the inventive concept, the first base station BS1 may change the downlink scheduling assignment with respect to the first user equipment UE1, based on first interference information received from the first user equipment UE1. For example, the first base station BS1 may change the downlink scheduling assignment with respect to the first user equipment UE1 when the influence of the first interference signal on the first user equipment UE1 exceeds a reference value according to the first interference information. The first base station BS1 may obtain information about the uplink scheduling assignment of the second base station BS2 through a communication with the second base station BS2 and may change the downlink scheduling assignment with respect to the first user equipment UE1, based on the obtained information. In another example, the first base station BS1 may maintain the downlink scheduling assignment with respect to the first user equipment UE1 when the influence of the first interference signal on the first user equipment UE1 is equal to or less than a reference value according to the first interference information. In some embodiments of the inventive concept, the first base station BS1 may request the second base station BS2 to change the uplink scheduling assignment with respect to the second user equipment UE2, based on the first interference information transmitted from the first user equipment UE1. In response to the request from the first base station BS1, the second base station BS2 may change the uplink scheduling assignment with respect to the second user equipment UE2. In other words, the first base station BS1 may perform communication with the second base station BS2 to reduce interference of the second user equipment UE2 to the first user equipment UE1 and may change the downlink scheduling assignment with respect to the first user equipment UE1 or may request to change the uplink scheduling assignment with respect to the second user equipment UE2.

In an embodiment of the inventive concept, the first user equipment UE1 may receive a second uplink signal of the second user equipment UE2 as a second interference signal next to the first interference signal, and the first user equipment UE1 may perform a measurement of the second interference signal, based on a first reception timing of the first interference signal. In other words, the first reception timing is based on characteristics of propagation paths between the first user equipment UE1 and the second user equipment UE2, and a second reception timing of the first user equipment UE1 for receiving the second interference signal may be the same as or similar to the first reception timing, unless, for example, a locational relationship between the first user equipment UE1 and the second user equipment UE2 rapidly changes.

In an embodiment of the inventive concept, the first user equipment UE1 may estimate the second reception timing of the second interference signal based on the first reception timing, and the second interference signal may be precisely and effectively measured at the estimated second reception timing. The first user equipment UE1 may generate the second interference information from measurement results of the second interference signal and transmit the second interference information to the first base station BS1. In an embodiment of the inventive concept, the first base station BS1 may change the downlink scheduling assignment with respect to the first user equipment UE1, based on second interference information received from the first user equipment UE1.

A method of measuring the reception timing of the first user equipment UE1 for receiving the interference signal from the second user equipment UE2 may vary depending on the kind of the interference signal, according to an embodiment of the inventive concept. For example, when the interference signal is a sounding reference signal, the first user equipment UE1 may measure the reception timing by the measurement method considering the characteristics of the sounding reference signal, and when the interference signal is a general uplink signal, the first user equipment UE1 may measure the reception timing by a measurement method that may be commonly applied to general user equipment.

The first user equipment UE1 according to the embodiment of the inventive concept determines the reception timing of the interference signal from the second user equipment UE2 and uses the reception timing to measure the interference signal that is transmitted later, and thus, the interference signal may be precisely and effectively measured.

The first base station BS1 according to the embodiment of the present inventive concept changes the downlink scheduling assignment with respect to the first user equipment UE1, based on the interference information transmitted from the first user equipment UE1, and thus, a network throughput with the first user equipment UE1 may be improved.

Figure 2A:
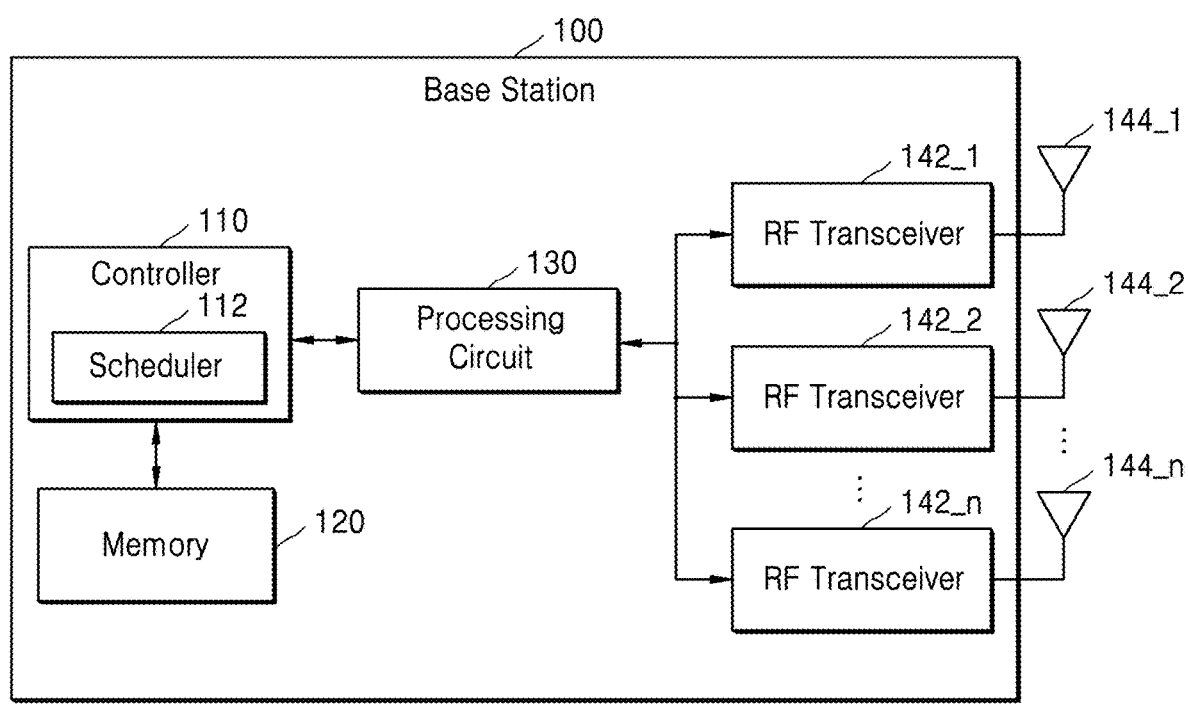
FIGS. 2A and 2B are block diagrams showing an example of implementing a base station and user equipment according to an embodiment of the inventive concept.
Figure 2B:
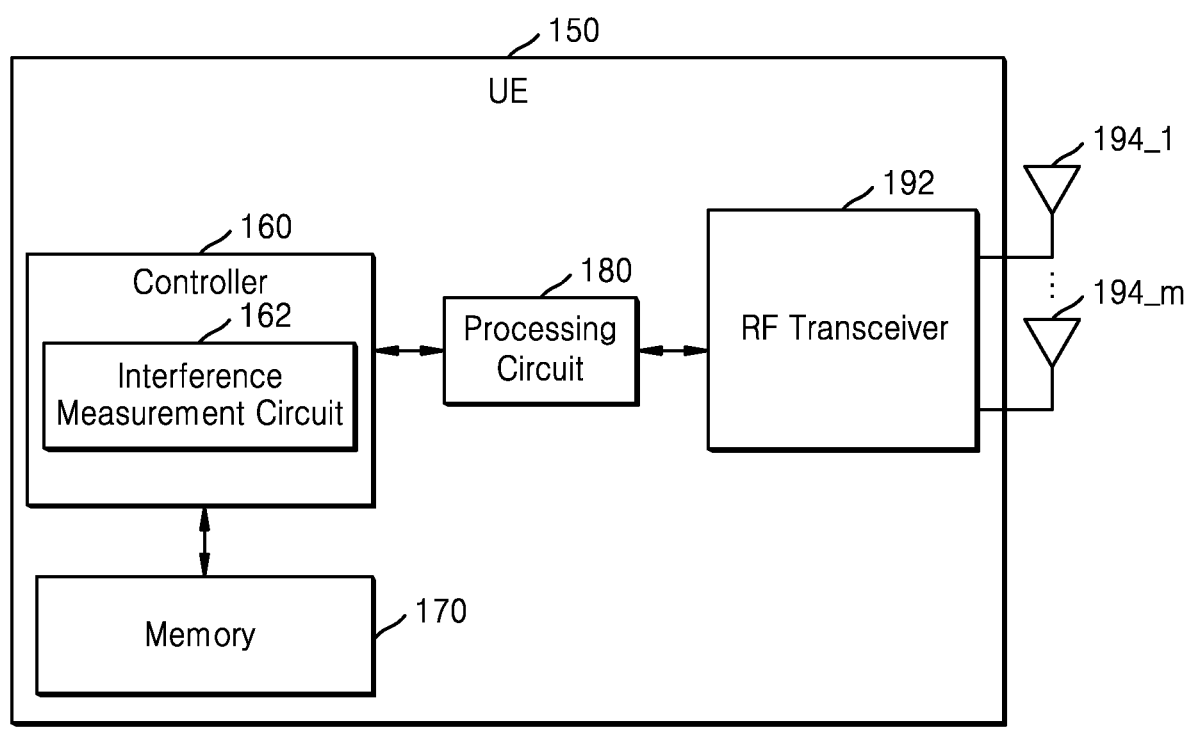

FIGS. 2A and 2B are block diagrams showing an example of implementing a base station 100 and user equipment 150 according to an embodiment of the inventive concept. The implemented example of the base station 100 and the user equipment 150 in FIGS. 2A and 2B may be respectively applied to the first base station BS1 and the first user equipment UE1 of FIG. 1.

Referring to FIG. 2A, the base station 100 may include a controller 110, a memory 120, a processing circuit 130, a plurality of radio frequency (RF) transceivers 142_1 to 142_$n$, and a plurality of antennas 144_1 to 144_$n$. The RF transceivers 142_1 to 142_$n$ may receive, from the antennas 144_1 to 144_$n$, RF signals transmitted from user equipment in a network. The RF transceivers 142_1 to 142_$n$ may generate intermediate frequency (IF) or baseband signals by down-converting frequencies of the received RF signals. The processing circuit 130 may generate data signals by filtering, decoding, and/or digitalizing the IF or baseband signals. The controller 110 may additionally process the data signals.

In addition, the processing circuit 130 may receive the data signals from the controller 110. The processing circuit 130 may encode, multiply, and/or perform analog conversion on the data signals. The RF transceivers 142_1 to 142_n may up-convert frequencies of the IF or baseband signals output from the processing circuit 130 and may transmit the up-converted signals as RF signals via the antennas 144_1 to 144_n.

The controller 110 may perform all communication control operations of the base station 100 for NR network-based communication and may include a scheduler 112 that performs a channel scheduling assignment with respect to the user equipment in the coverage of the base station 100.

In an embodiment of the inventive concept, the scheduler 112 may generate signals of information required for the user equipment within the coverage (e.g., coverage area) of the base station 100 to measure the interference signals transmitted from the adjacent user equipment within a coverage of another base station. For example, the scheduler 112 may generate at least one of the signal notifying the user equipment of a measuring section (or timing detection section) of the interference signal and information about the interference signal. In the present specification, information about the interference signal may be referred to as uplink information regarding adjacent user equipment transmitting the interference information. For example, when the interference signal is a sounding reference signal, the information about the interference signal may include an identification (ID) of the sounding reference signal and location information of the sounding reference signal within a frequency domain.

In an embodiment of the inventive concept, the scheduler 112 may perform an operation for reducing the interference from the adjacent user equipment with reference to the interference information transmitted from the user equipment within the coverage of the base station 100. For example, the scheduler 112 may change the downlink scheduling assignment with respect to the user equipment, based on the interference information received from the user equipment. In another example, the scheduler 112 may request to change the uplink scheduling assignment with respect to the user equipment of an adjacent base station, based on the interference information received from the user equipment.

The controller 110 may execute a program and/or process stored in the memory 120 to perform all communication control operations of the base station 100. In some embodiments, the scheduler 112 may be stored in the memory 120 as program code executed to perform the scheduling operation according to the embodiments of the present inventive concept, and the controller 110 may access the memory 120 and execute the program code stored in the memory 120 to perform the operation of the scheduler 112.

Referring to FIG. 2B, the user equipment 150 may include a controller 160, a memory 170, a processing circuit 180, an RF transceiver 192, and a plurality of antennas 194_1 to 194_m.

The RF transceiver 192 may receive RF signals transmitted from the base station 100 via the antennas 194_1 to 194_m. The RF transceiver 192 may generate IF or baseband signals by down-converting the RF signals. The processing circuit 180 may generate data signals by filtering, decoding, and/or digitalizing the IF or baseband signals. The controller 160 may additionally process the data signals.

In addition, the processing circuit 180 may receive the data signals from the controller 160. The processing circuit 180 may encode, multiply, and/or perform analog conversion on the data signals. The RF transceiver 192 may up-convert frequencies of the IF or baseband signals output from the processing circuit 180 and may transmit the up-converted signals as RF signals via the antennas 1941 to 194_m.

The controller 160 according to the present embodiment may perform all communication control operations for the NR network-based communication and may include an interference measurement circuit 162 for measuring the interference signal from adjacent user equipment within the coverage of another base station.

In an embodiment of the inventive concept, the interference measurement circuit 162 may measure the interference signal from the adjacent user equipment and determine the reception timing from the certain number of measurement results. The interference measurement circuit 162 may generate an indicator representing an influence of the interference signal on the user equipment 150 from the measurement results and transfer the indicator to the base station 100 (see FIG. 2A). In an embodiment of the inventive concept, the interference measurement circuit 162 may measure the interference signal by predicting the reception timing of the interference signal that is to be received later from the adjacent user equipment, based on the determined reception timing.

In an embodiment of the inventive concept, the interference measurement circuit 162 may measure the interference signal by using the measurement method that is suitable for the kind of the interference signal, from among a plurality of methods of measuring an interference signal. For example, the methods of measuring an interference signal may include, when the interference signal is a sounding reference signal, a first measurement method using a matching filter based on information about the sounding reference signal (described later with reference to FIGS. 5A to 6B) and a second measurement method using a repeated transmission characteristic of the sounding reference signal (described later with reference to FIGS. 7A and 7B), and when the interference signal is a general uplink signal, the methods may include a third measurement method that may be commonly applied to the general uplink signal (described later with reference to FIGS. 8A and 8B). In addition, the third measurement method may be also used when the interference signal is a sounding reference signal.

The controller 160 may execute a program and/or process stored in the memory 170 in order to perform all communication control operations of the terminal 150. In some embodiments, the interference measurement circuit 162 may be stored in the memory 170 as program code that is executed to perform the measurement operation of the interference signal according to the embodiments of the inventive concept, and the controller 160 may access the memory 170 and execute the program code stored in the memory 170 to perform operations of the interference measurement circuit 162.

Figure 3A:
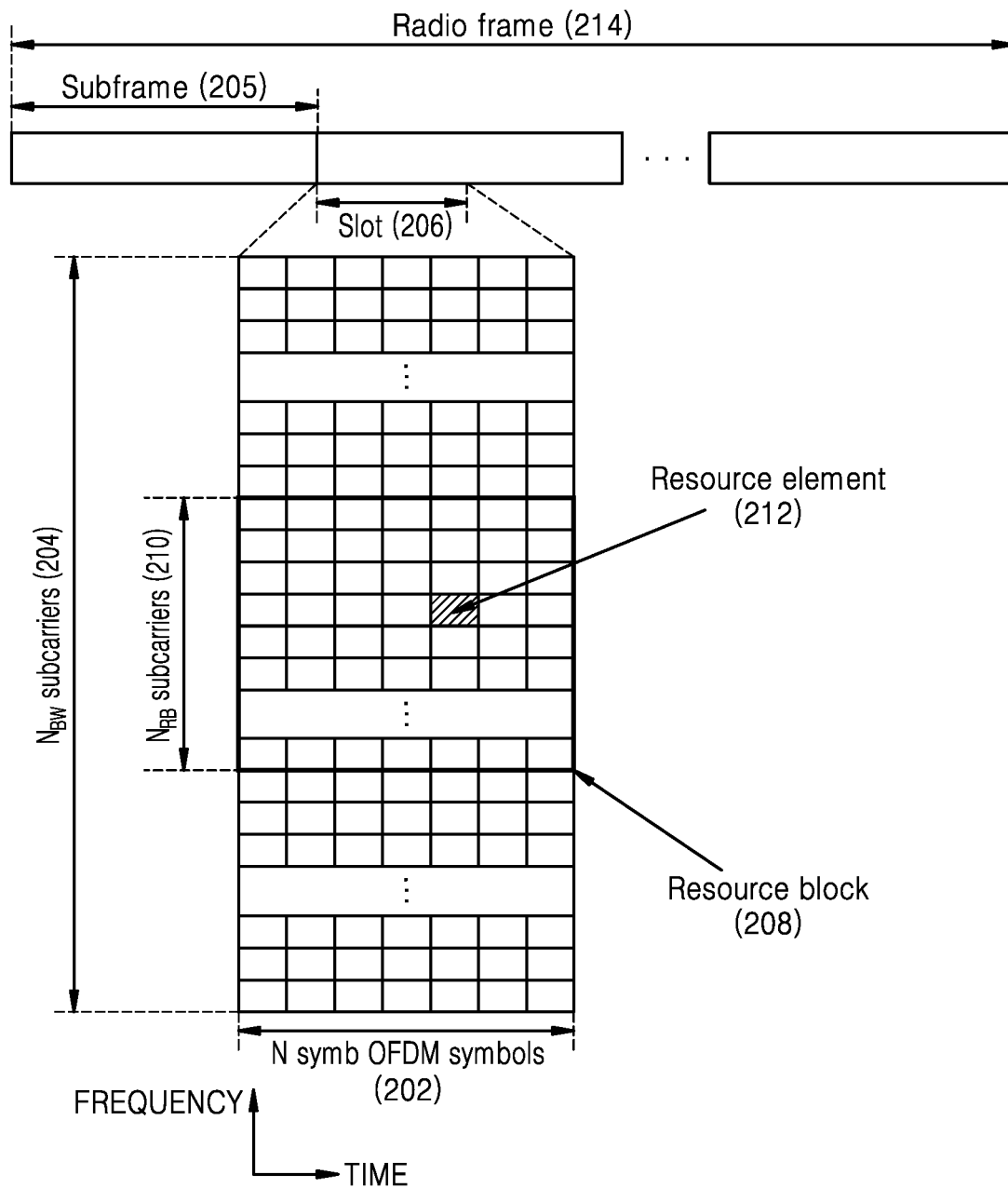
FIG. 3A is a diagram showing a basic structure of a time-frequency domain that is a wireless resource region in a wireless communication system according to an embodiment of the present inventive concept.
Figure 3B:
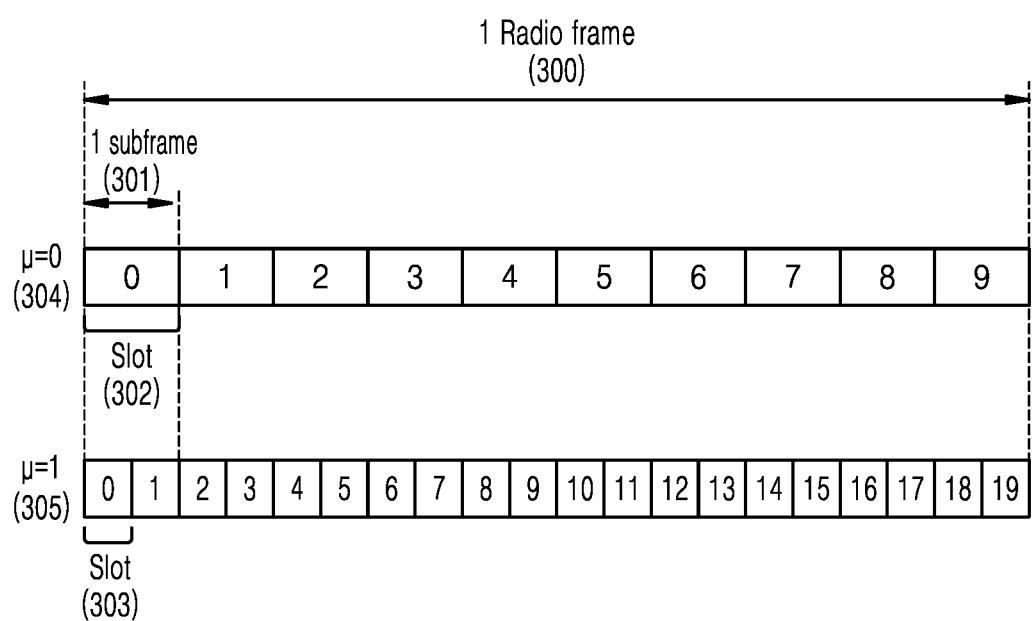
FIG. 3B is a diagram showing a slot structure in a wireless communication system according to an embodiment of the present inventive concept.

FIG. 3A is a diagram showing a basic structure of a time-frequency domain that is a wireless resource region in a wireless communication system according to an embodiment of the inventive concept, and FIG. 3B is a diagram showing a slot structure in a wireless communication system according to an embodiment of the inventive concept.

Referring to FIG. 3A, the horizontal axis denotes a time domain and the longitudinal axis denotes a frequency domain. A minimum transmission unit in the time domain is an orthogonal frequency division multiplexing (OFDM) symbol, and $N_{symb}$ OFDM symbols 202 may configure one slot 206. Two slots may configure one subframe 205. For example, the slot 206 may have a length of 0.5 ms and the subframe may have a length of 1.0 ms. However, the embodiments are not limited thereto, and the length of the slot 206 may vary according to the configuration of the slot 206. In addition, the subframe 205 is based on an LTE network, and in a 5G network, the time-frequency domain may be based on the slot 206. In addition, a radio frame 214 may be a time domain unit including ten subframes 205.

A minimum transmission unit in the frequency domain is a sub-carrier, and a bandwidth of a total transmission band may include a total of $N_{BW}$ sub-carriers 204. In the time-frequency domain, a basic unit of the resource is a resource element (RE) 212 and may be indicated by an OFDM symbol index and a sub-carrier index. A resource block (RB) 208 may correspond to $N_{symb}$ successive OFDM symbols 202 in the time domain and as $N_{RB}$ successive sub-carriers 210 in the frequency domain. Therefore, one RB 208 may include ($N_{symb} \times N_{RB}$) REs 212. An RB pair indicates a unit of two consecutive RBs in the time domain, which includes ($N_{symb} \times 2N_{RB}$) REs 112.

In addition, from among the resources of the time-frequency domain as shown in FIG. 3A, resources to which the downlink signal received by the first user equipment UE1 (see FIG. 1) and resources to which the uplink signal transmitted from the second user equipment UE2 (see FIG. 1) may overlap each other, and thus, for the first user equipment UE1 (see FIG. 1) side, the uplink signal of the second user equipment UE2 (see FIG. 1) may correspond to an interference signal.

The first user equipment UE1 (see FIG. 1) may measure the interference signal by the measurement method according to the embodiments of the inventive concept to determine the reception timing of the interference signal and may support precise and effective measurement of the interference signal by using the determined reception timing in an operation of measuring the interference signal later.

The first base station BS1 (see FIG. 1) performs a channel scheduling with respect to the first user equipment UE1 (see FIG. 1) based on the precise interference information from the first user equipment UE1 (see FIG. 1), and thus, a communication performance with the first user equipment UE1 (see FIG. 1), a network throughput, etc. may be improved.

Referring to FIG. 3B, one radio frame 300 is 10 ms, a subframe 301 may be 1 ms, and the frame 300 may include ten subframes 301. One slot 302 or 303 may be defined by fourteen OFDM symbols (in other words, the number of symbols per one slot ($N_{symb}^{slot}$=14)). One subframe 301 may include one slot or a plurality of slots 302 and 303, and the number of slots 302 and 303 per one subframe 301 may vary depending on a set value μ 304 and 305 about a subcarrier spacing and the number of symbols included in the slots 302 and 303. FIG. 3B shows that the subcarrier spacing set value is μ=0 (304) and μ=1 (305). When the subcarrier spacing set value is μ=0(304), one subframe 301 includes one slot 302 (e.g., value 0), and when the subcarrier spacing set value is μ=1 (305), one subframe 301 may include two slots 303 (e.g., value 0 and 1).

As described above, the number of slots per one subframe may vary depending on the set value μ with respect to the subcarrier spacing, and accordingly, the number of slots per one frame may be changed. The number of slots ($N_{slot}^{subframe,\mu}$) per one subframe and the number of slots ($N_{slot}^{frame,\mu}$) per one frame according to the set value R with respect to the subcarrier spacing may be defined by Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In addition, in some embodiments, the number of slots per one subframe may vary depending on the number of symbols included in one slot.

In an embodiment of the inventive concept, the first base station BS1 (see FIG. 1) may set a measurement period (or timing detection period) of the interference signal of the user equipment taking into account the number of slots per subframe or the subcarrier spacing and may indicate the measurement period (or timing detection period) set in the user equipment. In addition, in an embodiment of the inventive concept, the first user equipment UE1 (see FIG. 1) may set the number or locations of timing candidates within the measurement period (or timing detection period) considering the number of slots per subframe or the subcarrier spacing.

FIG. 4 is a flowchart for describing a method of operating a wireless communication system according to an embodiment of the present inventive concept. The wireless communication system includes first and second base stations 400 and 410, and first and second user equipment 420 and 430. It is assumed that the first user equipment 420 is within a coverage area of the first base station 400 and the second user equipment UE2 is within a coverage area of the second base station 410. The second user equipment 430 is adjacent to the first user equipment 420 and may correspond to an interference element of the first user equipment 420. In other words, the second user equipment 430 may interfere with signals received by the first user equipment 420.

In operation S100, the first base station 400 may perform a downlink scheduling assignment with respect to the first user equipment 420. In other words, the first base station 400 may perform a downlink scheduling assignment for the first user equipment 420. The first base station 400 sets a format of downlink control information for transmitting a downlink signal to the first user equipment 420 and may perform an operation such as setting of resources to which the downlink signal is assigned. In addition, the first base station 400 may periodically transmit information about the downlink scheduling assignment to the first user equipment 420 via a control channel.

In operation S110, the first base station 400 may generate a first downlink signal based on the downlink scheduling assignment in operation S100. In operation S120, the first base station 400 may transmit the first downlink signal to the first user equipment 420. In addition, in operation S130, the second user equipment 430 may transmit a first uplink signal to the second base station 410. In this case, the first user equipment 420 may receive a first uplink signal of the second user equipment 430 as a first interference signal with respect to the first downlink signal. In other words, the first user equipment 420 may receive both of the first downlink signal and the first uplink signal.

In operation S140, the first user equipment 420 performs a measurement of the first interference signal to generate a plurality of measurement results and may determine a first reception timing of the first interference signal, based on the plurality of measurement results. In other words, the first user equipment 420 measures the first interference signal, i.e., the first uplink signal, and determines when the first interference signal was received. In operation S150, the first user equipment 420 may generate first interference information by using the plurality of measurement results generated in operation S140. In some embodiments, the first interference information may include information about the first reception timing determined in operation S140. In operation S160, the first user equipment 420 may transmit the first interference information to the first base station 400. For example, the first user equipment 420 may transmit the time when the first uplink signal was received to the first base station 400.

In operation S170, the first base station 400 may determine to change the current downlink scheduling assignment, when it is identified that the influence of the first interference signal on the first user equipment 420 exceeds a reference value with reference to the first interference information and may perform an assignment information signaling with the second base station 410. The first base station 400 may obtain, from the second base station 410, information about uplink scheduling setting with respect to the second user equipment 430. In operation S180, the first base station 400 may change the downlink scheduling assignment based on the information about the uplink scheduling setting obtained from the second base station 410. The first base station 400 may change the downlink scheduling assignment to reduce overlapping resource assignments between a second downlink signal that is transmitted to the first user equipment 420 next to the first downlink signal and the first uplink signal from the second user equipment 430.

In addition, the first base station 400 may determine to maintain the current downlink scheduling assignment when it is identified that the influence of the first interference signal on the first user equipment 420 is less than the reference value with reference to the first interference information. In this case, operation S170 and operation S180 may be omitted.

In some embodiments, the first base station 400, instead of performing operation S170, may request the second base station 410 to change the uplink scheduling assignment with respect to the second user equipment 430, and thus, may induce the uplink scheduling assignment of the second base station 410 while maintaining its downlink scheduling assignment.

Figure 5A:
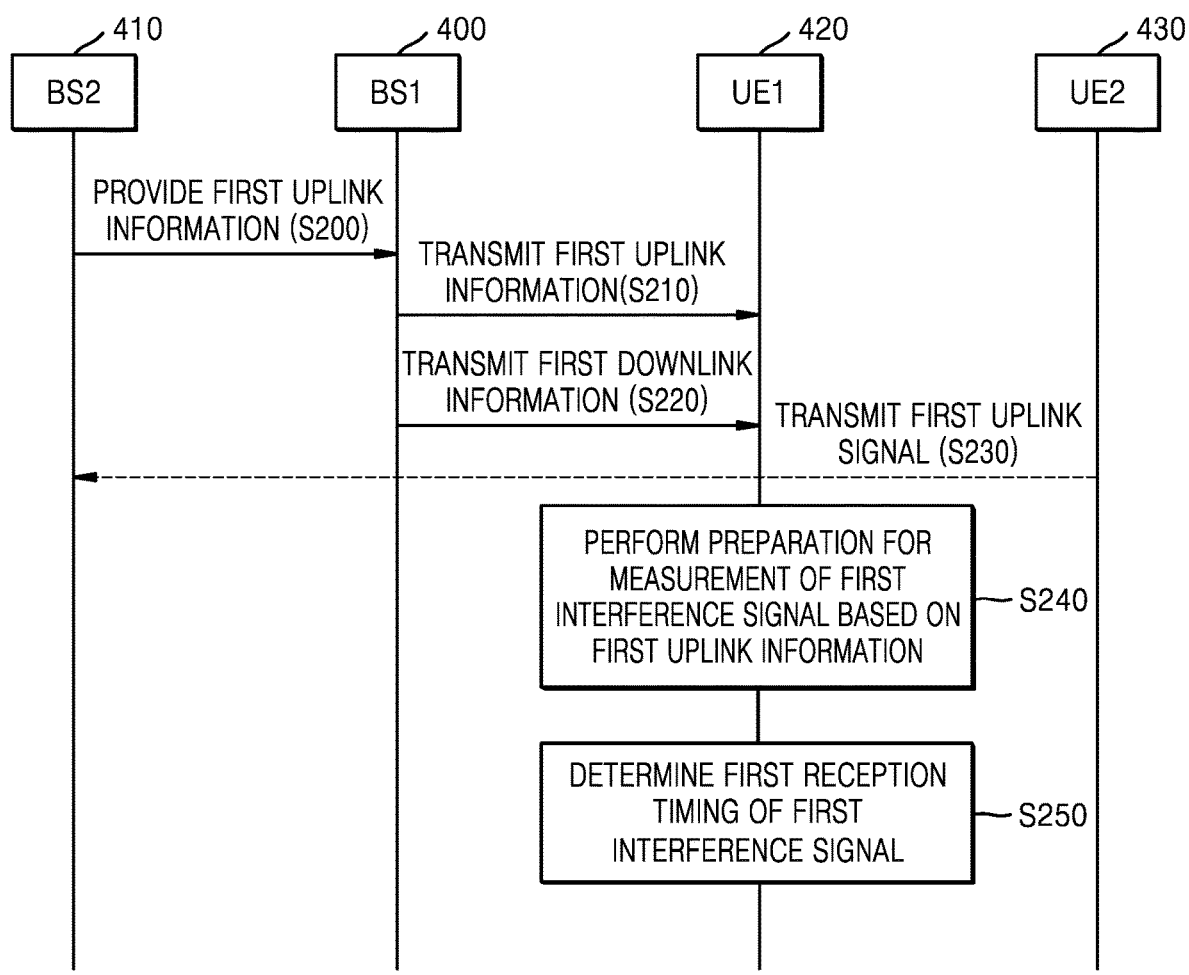
FIG. 5A is a flowchart for describing a first measurement method of first user equipment according to an embodiment of the present inventive concept.
Figure 5B:
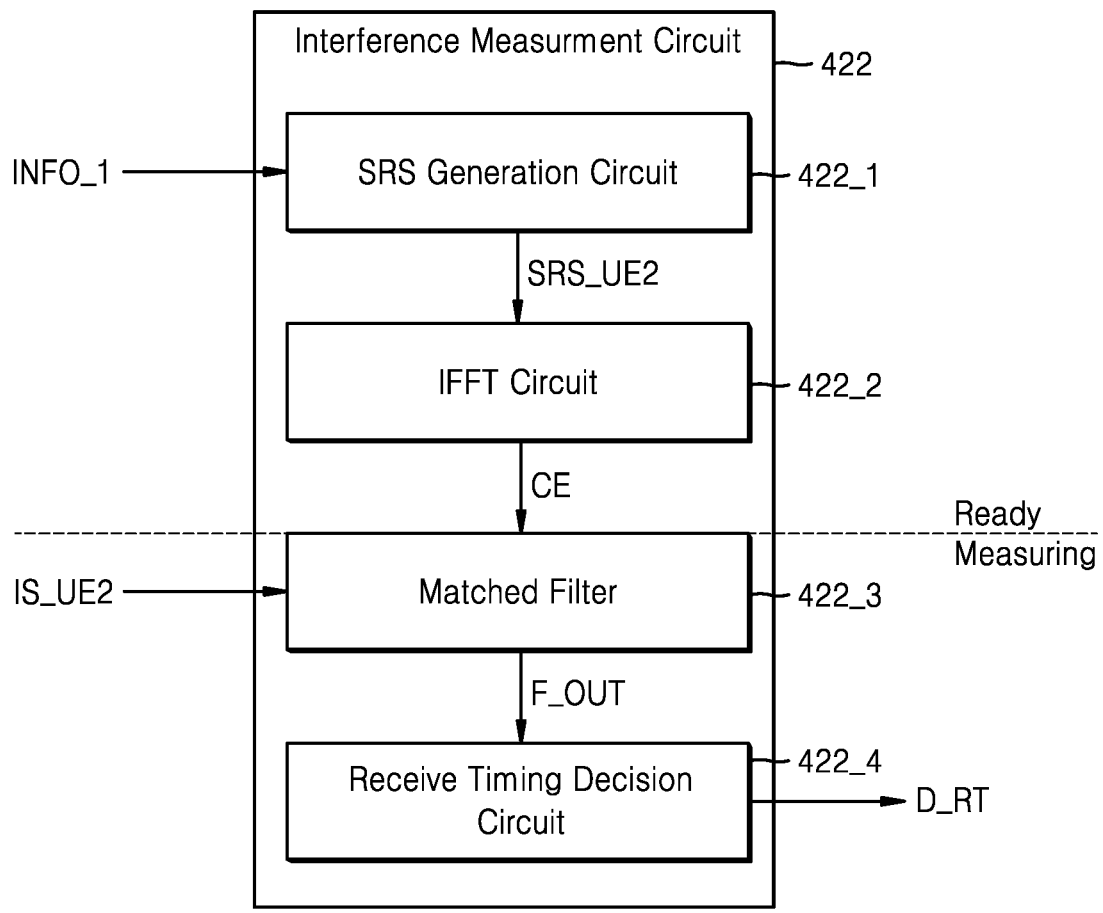
FIG. 5B is a block diagram of an interference measurement circuit of the first user equipment to which the first measurement method of FIG. 5A is applied.

FIG. 5A is a flowchart for describing a first measurement method of the first user equipment 420 according to an embodiment of the inventive concept, and FIG. 5B is a block diagram of an interference measurement circuit 422 of the first user equipment 420 to which the first measurement method of FIG. 5A is applied. Hereinafter, it is assumed that the uplink signal or the interference signal is a sounding reference signal in FIGS. 5A and 5B.

Referring to FIG. 5A, in operation S200, the second base station 410 may provide first uplink information about the second base station 410 to the first base station 400. The first uplink information may include an ID of the sounding reference signal assigned to the second user equipment 430 and location information of the sounding reference signal assigned to the second user equipment 430 in the frequency domain. In the present specification, the uplink information may be referred to as information about the sounding reference signal or information about the interference signal.

In operation S210, the first base station 400 may transmit the first uplink information to the first user equipment 420.

For example, the first base station 400 may process the first uplink information provided in operation S200 to be suitable for its wireless network, and then transmit the first uplink information to the first user equipment 420. In an embodiment of the inventive concept, the first base station 400 may transmit the first uplink information through a radio resource control (RRC) signaling with the first user equipment 420. In operation S220, the first base station 400 may transmit a first downlink signal to the first user equipment 420. The first downlink signal may be generated based on operation S100 shown in FIG. 4. In operation S230, the second user equipment 430 may transmit the first uplink signal to the second base station 410. Here, the first user equipment 420 may receive the first uplink signal of the second user equipment 430 as a first interference signal with respect to the first downlink signal.

In operation S240, the first user equipment 420 may prepare to measure the first interference signal, based on the first uplink information. In an embodiment of the inventive concept, the first user equipment 420 may set a coefficient of a matched filter, based on the first uplink information. In operation S250, the first user equipment 420 measures the first interference signal by using the matched filter set in operation S240 and generates a plurality of measurement results, and thus, may determine the first reception timing of the first interference signal from the plurality of measurement results. Detailed operations in operation S240 and operation S250 will be described below with reference to FIG. 5B. In addition, detailed examples of the method of determining the first reception timing of the first interference signal in the first user equipment 420 will be described later with reference to FIGS. 9 to 12.

Referring to FIG. 5B, the interference measurement circuit 422 may include a sounding reference signal (SRS) generation circuit 422_1, an inverse fast Fourier transform (IFFT) circuit 422_2, a matched filter 4223, and a reception timing determination circuit 422_4. The SRS generation circuit 422_1 and the IFFT circuit 422_2 may be elements for executing operation S240 in FIG. 5A, and the matched filter 422_3 and the reception timing determination circuit 422_4 may be elements for executing operation S250 in FIG. 5A.

In an embodiment of the inventive concept, the SRS generation circuit 422_1 receives first uplink information INFO_1 and may generate a sounding reference signal SRS_UE2 that is identical to the sounding reference signal transmitted from the second user equipment 430, based on the SRS generation circuit 422_1 and the first uplink information INFO_1. For example, the SRS generation circuit 422_1 may directly generate the sounding reference signal SRS_UE2 by using the sounding reference signal ID and the location information in the frequency domain included in the first uplink information INFO_1.

In an embodiment of the inventive concept, the IFFT circuit 422_2 may convert the sounding reference signal SRS_UE2 into a time domain signal and may use the converted signal to set a coefficient CE of the matched filter 422_3.

In an embodiment of the inventive concept, the matched filter 422_3 may receive a first interference signal IS_UE2 and generate a filter output F_OUT. The reception timing determination circuit 422_4 may receive the filter output F_OUT and may determine the first reception timing of the first interference signal IS_UE2, based on the filter output F_OUT. For example, the filter output F_OUT may be generated according to continuous time or discrete time.

Operations of the matched filter 422_3 and the reception timing determination circuit 422_4 may be according to Equation 1 below.

$$\hat{m} = \arg\max_{m} y(m), \text{ where } y(m) = \sum_{n=-\infty}^{\infty} h*(m-n)r(n) \quad \text{[Equation 1]}$$

r(n) may denote the received first interference signal IS_UE2, h(n) may denote a function of the matched filter 422_3, $\hat{m}$ may denote a first reception timing of the first interference signal IS_UE2, and y(m) may denote the filter output F_OUT.

In an embodiment of the inventive concept, the reception timing determination circuit 422_4 may determine a timing at which the filter output F_OUT is the largest as the first reception timing (m) and may output a determination result D_RT including the determined first reception timing (m). The determination result D_RT may be stored in a memory of the first user equipment 420 to be used when determining a second reception timing of a second interference signal that is transmitted next to the first interference signal IS_UE2. In addition, the determination result D_RT may be included in the first interference information and transmitted to the first base station 400.

In addition, in an embodiment of the inventive concept, during the timing detection period, the matched filter 422_3 passes the first interference signal IS_UE2 to generate the filter output F_OUT, and the reception timing determination circuit 422_4 may determine the first reception timing (n) from the filter output F_OUT. The first base station 400 may teach the timing detection period to the first user equipment 420. For example, the first base station 400 may teach a start timing of the timing detecting period to the first user equipment 420. In other words, the first base station 400 may provide the start timing of the timing detecting period to the first user equipment 420. Next, the first user equipment 420 may recognize the timing detecting period by identifying an end timing of the timing detection period, in other words, after a preset time from the start timing. In the present specification, the timing detection period of the first interference may be referred to as a first timing detection period.

Figure 6A:
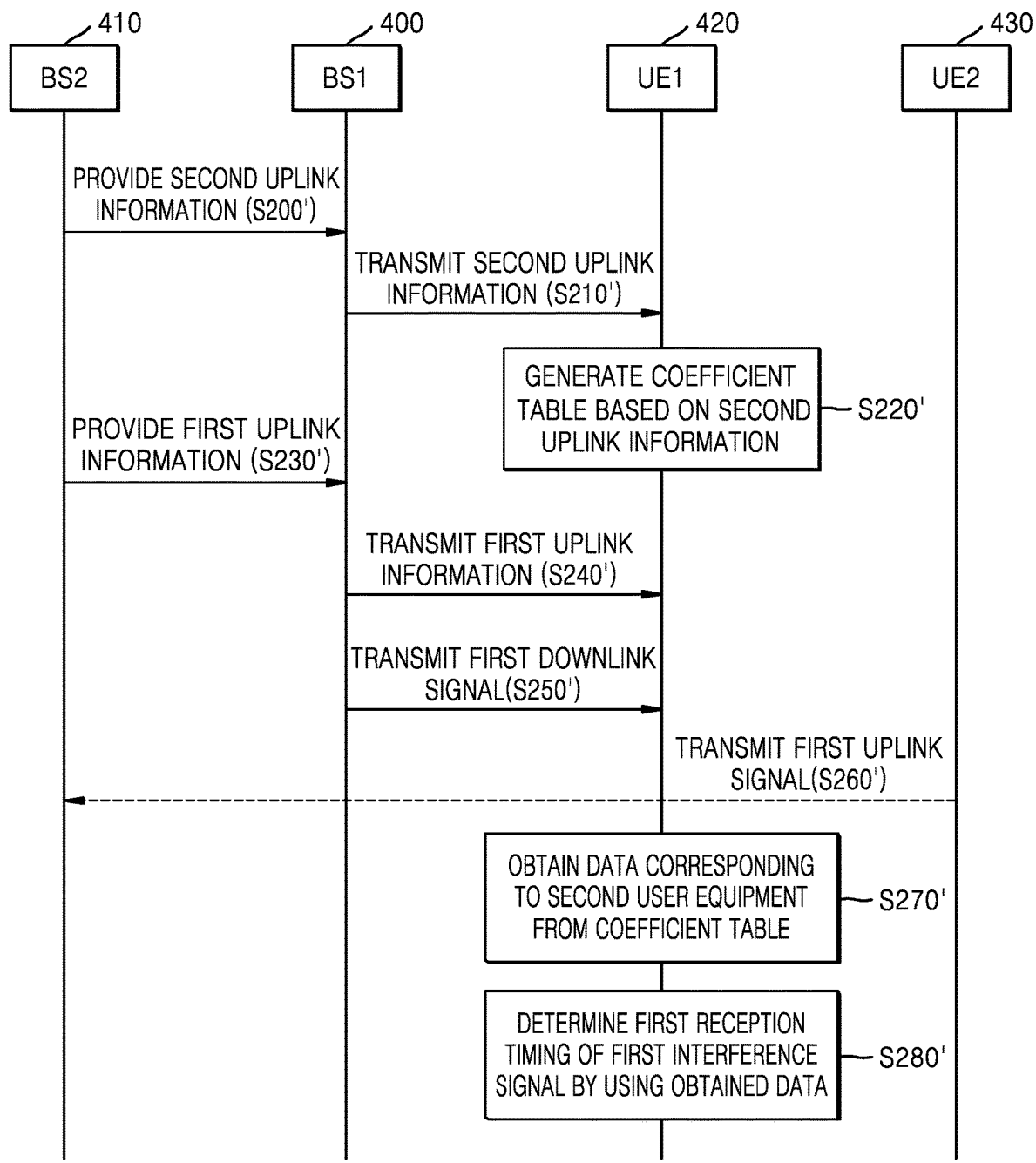
FIG. 6A is a flowchart for describing a first measurement method of a first user equipment according to an embodiment of the present inventive concept.
Figure 6B:
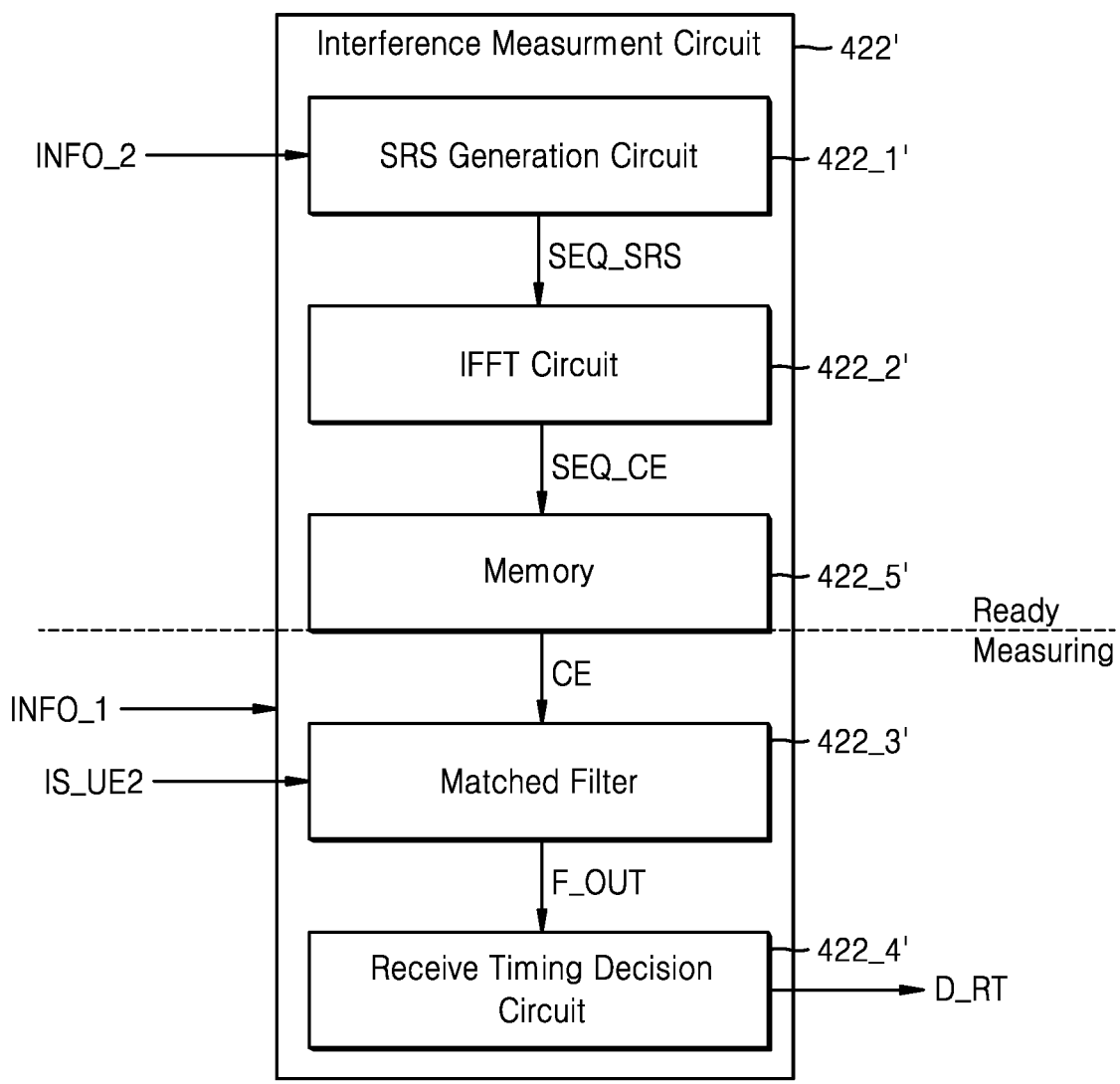
FIG. 6B is a block diagram of an interference measurement circuit of the first user equipment to which the first measurement method of FIG. 6A is applied.

FIG. 6A is a flowchart for describing a first measurement method of the first user equipment 420 according to an embodiment of the inventive concept, and FIG. 6B is a block diagram of an interference measurement circuit 422' of the first user equipment 420 to which the first measurement method of FIG. 6A is applied. Hereinafter, it is assumed that the uplink signal or the interference signal is a sounding reference signal in FIGS. 6A and 6B.

Referring to FIG. 6A, in operation S200', the second base station 410 may provide second uplink information about the second base station 410 to the first base station 400. The second uplink information may include IDs of sounding reference signals that may be assigned by the second base station 410 to user equipment within the coverage area thereof and location information of the sounding reference signals in the frequency domain. In other words, the second uplink information may include information about all the sounding reference signals that may be assigned by the second base station 410 to the user equipment within its own coverage area. Here, overlapping descriptions about the first measurement method of the first interference signal IS_UE2 by using a matched filter 422_3', with the descriptions provided with reference to FIGS. 5A and 5B are omitted.

In operation S210', the first base station 400 may transmit the second uplink information to the first user equipment 420. For example, the first base station 400 may process the second uplink information provided in operation S200' to correspond to the wireless network of its own, and then transmit the first uplink information to the first user equipment 420. In an embodiment of the inventive concept, the first base station 400 may transmit the second uplink information through the RRC signaling with the first user equipment 420.

In operation S220', the first user equipment 420 may generate a coefficient table based on the second uplink information. In an embodiment of the inventive concept, the first user equipment 420 may generate sounding reference signals based on IDs of the sounding reference signals in the second uplink information and location information of sounding reference signals in the frequency domain, and may generate a coefficient table including coefficients of matched filters corresponding respectively to the sounding reference signals. In other words, the first user equipment 420 may prepare, in advance, the coefficients of matched filters corresponding respectively to the all the sounding reference signals that may be transmitted from the second user equipment 430.

In operation S230', the second base station 410 may provide first uplink information about the second base station 410 to the first base station 400. The first uplink information may include an ID of the sounding reference signal that is currently assigned to the second user equipment 430 and location information of the sounding reference signal assigned to the second user equipment 430 in the frequency domain.

In operation S240', the first base station 400 may transmit the first uplink information to the first user equipment 420. For example, the first base station 400 may process the first uplink information provided in operation S240' and transmit the first uplink information to the first user equipment 420. In an embodiment of the inventive concept, the first base station 400 may transmit the first uplink information through an RRC signaling with the first user equipment 420. In operation S250', the first base station 400 may transmit a first downlink signal to the first user equipment 420. The first downlink signal may be generated based on operation S100 shown in FIG. 4. In operation S260', the second user equipment 430 may transmit the first uplink signal to the second base station 410. Here, the first user equipment 420 may receive the first uplink signal of the second user equipment 430 as a first interference signal with respect to the first downlink signal. In other words, the first uplink signal may interface with the first downlink signal at the first user equipment 420.

In operation S270', the first user equipment 420 may obtain, from the coefficient table, data corresponding to the second user equipment 430. In an embodiment of the inventive concept, the first user equipment 420 may obtain the coefficient of the matched filter corresponding to the first uplink signal of the second user equipment 430, from the coefficient table. In operation S280', the first user equipment 420 generates a plurality of measurement results by performing the measurement of the first interference signal using the obtained data, and may determine the first reception timing of the first interference signal from the plurality of measurement results. In an embodiment of the inventive concept, the first user equipment 420 may determine the first reception timing of the first interference signal by using a filter output that is generated by setting the matched filter by using the coefficient of the matched filter obtained in operation S270' and passing the first interference signal through the set matched filter.

Referring to FIG. 6B, the interference measurement circuit 422' may include an SRS generation circuit 422_1', an IFFT circuit 422_2', a matched filter 422_3', a reception timing determination circuit 422_4', and a memory 422_5'. The SRS generation circuit 422_1', the IFFT circuit 422_2', and the memory 422_5' may be elements for performing operation S220' of FIG. 6A, and the matched filter 422_3' and the reception timing determination circuit 4224' may be elements for performing operation S270' and operation S280' of FIG. 6A.

In an embodiment of the inventive concept, the SRS generation circuit 422_1' receives second uplink information INFO_2 and may generate all sounding reference signals that may be generated by the second user equipment 430, based on the second uplink information INFO_2. For example, the SRS generation circuit 422_1 may generate a first sequence SEQ_SRS including all of the sounding reference signals that may be transmitted by the second user equipment 430, by using the IDs of the sounding reference signal included in the second uplink information INFO_2 and the location information of the sounding reference signals in the frequency domain.

In an embodiment of the inventive concept, the IFFT circuit 422_2' may convert the sounding reference signals included in the first sequence SEQ_SRS into time domain signals and may generate a second sequence SEQ_CE including coefficients of the matched filter 422_3' corresponding to each of the sounding reference signals by using the converted signals. In an embodiment of the inventive concept, the memory 422_5' may store the second sequence SEQ_CE as a coefficient table.

In an embodiment of the inventive concept, the coefficient CE corresponding to the first uplink signal INFO_1 may be read from the memory 422_5' and used to set the matched filter 422_3'. In an embodiment of the inventive concept, the matched filter 4223' may receive a first interference signal IS_UE2 and generate a filter output F_OUT. The reception timing determination circuit 422_4' may receive the filter output F_OUT and may determine the first reception timing of the first interference signal IS_UE2, based on the filter output F_OUT, to generate a determination result D_RT.

Figure 7A:
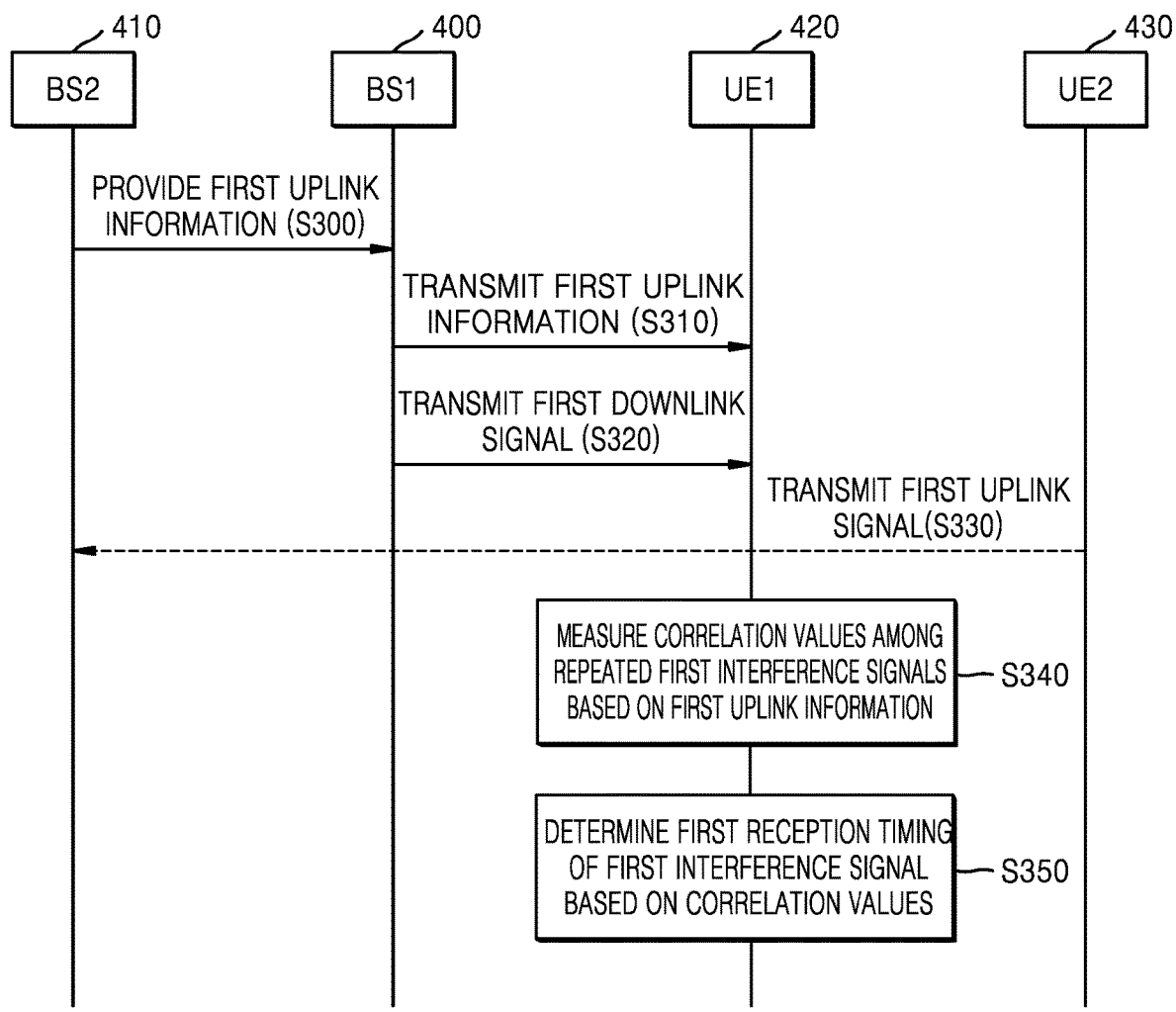
FIG. 7A is a flowchart for describing a second measurement method of second user equipment according to an embodiment of the present inventive concept.
Figure 7B:
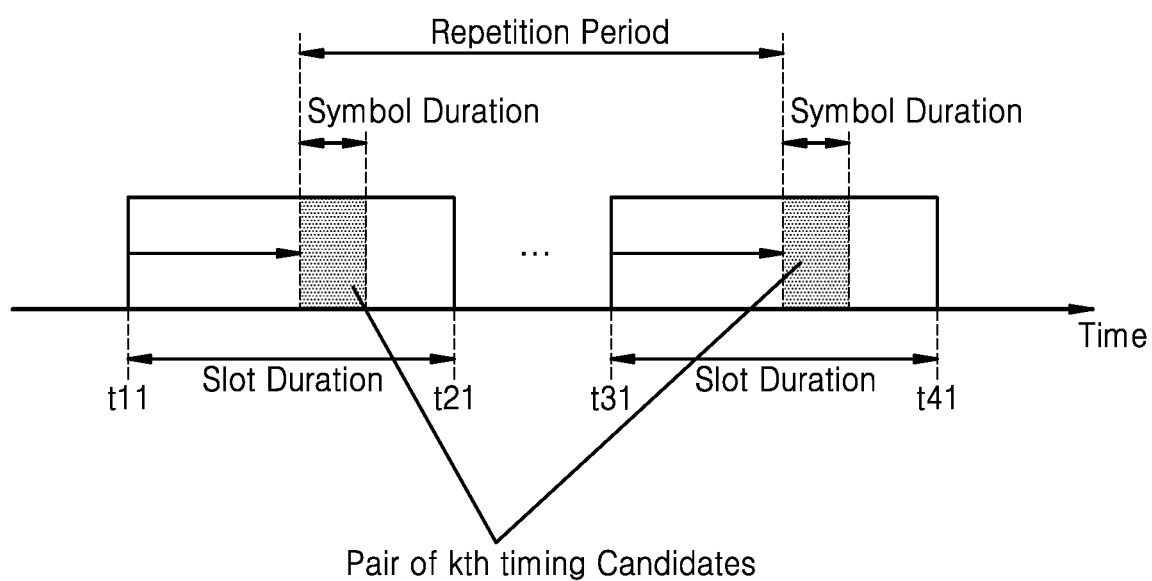
FIG. 7B is a timing diagram for describing the second measurement method of FIG. 7A in detail.

FIG. 7A is a flowchart for describing a second measurement method of second user equipment 430 according to an embodiment of the present inventive concept, and FIG. 7B is a timing diagram for describing the second measurement method of FIG. 7A in detail; Hereinafter, it is assumed that the uplink signal or the interference signal is a sounding reference signal in FIGS. 7A and 7B.

Referring to FIG. 7A, in operation S400, the second base station 410 may provide first uplink information about the second base station 410 to the first base station 400. In operation S310, the first base station 400 may transmit the first uplink information to the first user equipment 420. In operation S320, the first base station 400 may transmit the first downlink signal to the first user equipment 420. In operation S330, the second user equipment 430 may transmit the first uplink signal to the second base station 410. Here, the first user equipment 420 may receive a first uplink signal of the second user equipment 430 as a first interference signal with respect to the first downlink signal. Operation S300 to operation S330 are the same as or similar to operation S200 and operation S340 of FIG. 5A, and thus, detailed descriptions thereof are omitted.

In operation S340, the first user equipment 420 may measure correlation values among the first interference signals that are repeated based on the first uplink information. For example, the sounding reference signal transmitted from the second user equipment 430 to the second base station 410 as the first uplink signal may be repeatedly transmitted with a predetermined repetition cycle. In an embodiment of the inventive concept, the first user equipment 420 may measure the correlation values among the first interference signals, taking into account the repetition cycle. This will be described later with reference to FIG. 7B. In operation S350, the first user equipment 420 may determine a first reception timing of the first interference signal, based on the correlation values measured in operation S340. Detailed descriptions about the method of determining the first reception timing of the first interference signal in the first user equipment 420 will be described later with reference to FIGS. 9 to 12.

Referring to FIG. 7B, a section corresponding to t11 to t21 is a slot duration and may be referred to as a timing detection period. The first user equipment 420 may receive the first interference signal having a certain repetition period. The first user equipment 420 may divide times included in the timing detection period into a plurality of timing candidates. For example, the first user equipment 420 may set a plurality of timing candidates by dividing the timing detection period in units of the symbol duration. However, one or more embodiments of the inventive concept are not limited thereto, and the timing detection period may be divided into units greater or less than the symbol duration unit and set a plurality of timing candidates. The first user equipment 420 may set timing candidates respectively pairing with the plurality of timing candidates of the timing detection period based on the repetition period, from a section corresponding to t31 to t41.

In an embodiment of the inventive concept, the first user equipment 420 may measure a correlation value of each of the pairs of the plurality of timing candidates in the section corresponding to t11 to t21 and the section corresponding to t31 to t41. For example, the first user equipment 420 may measure the correlation value of a k-th (here, k is 1 or greater integer) timing candidate pair. The first user equipment 420 may determine the first reception timing of the first interference signal based on the measured correlation values.

Figure 8A:
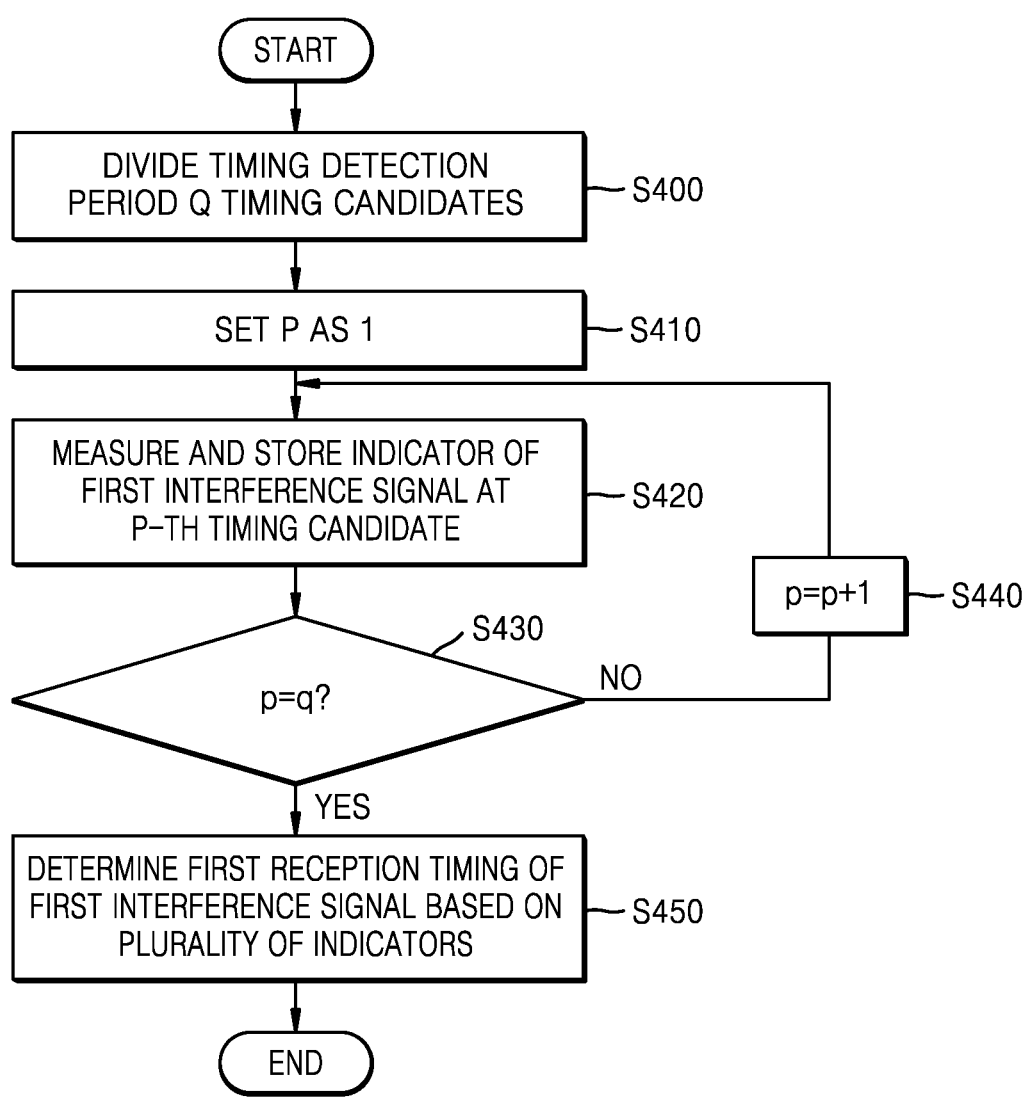
FIG. 8A is a flowchart for describing a third measurement method of first user equipment according to an embodiment of the present inventive concept.
Figure 8B:
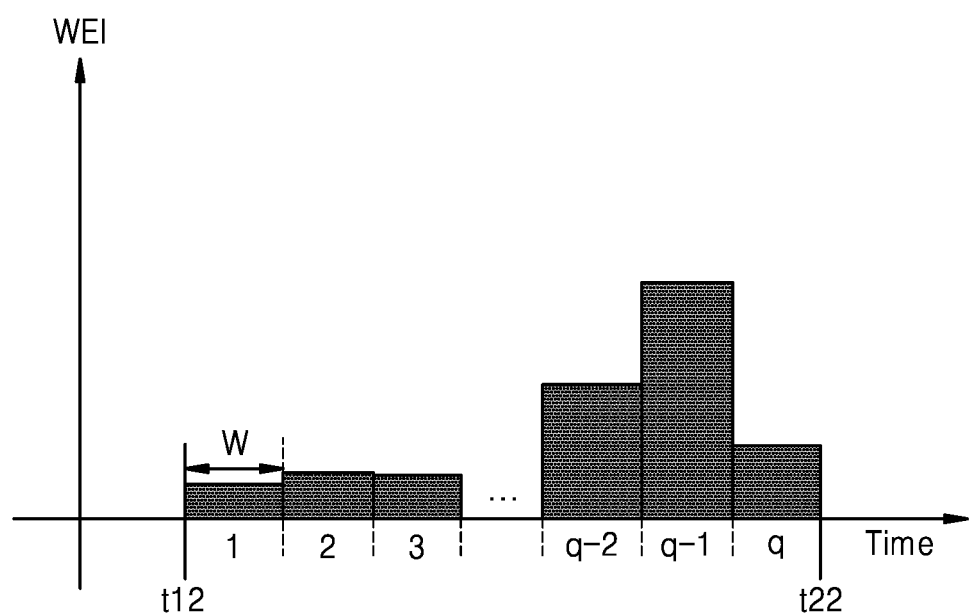
FIG. 8B is a timing diagram for describing the third measurement method of FIG. 8A in detail.

FIG. 8A is a flowchart for describing a third measurement method of the first user equipment 420 according to an embodiment of the present inventive concept, and FIG. 8B is a timing diagram for describing the third measurement method of FIG. 8A in detail. Hereinafter, the uplink signal or the interference in FIGS. 8A and 8B are general signals, and may correspond to one of the sounding reference signal, a signal through a physical uplink shared channel (PUSCH), a signal through a physical uplink control channel (PUCCH), etc.

Referring to FIG. 8A, in operation S400, the first user equipment may divide the timing detection period of the first interference signal into q timing candidates (here, q is 1 or greater integer). In an embodiment of the inventive concept, the number of timing candidates may be set in advance by the first user equipment 420. For example, the number of timing candidates may be pre-stored in a memory. The number of timing candidates may be related to a width of a timing candidate (or division unit) in the timing detection period. In other words, as the number of timing candidates increases, the width of the timing candidate (or division unit of the timing detection period) is reduced, and as the number of timing candidates decreases, the width of the timing candidate (or division unit of the timing detection period) may increase. In an embodiment of the inventive concept, the first user equipment may set the number of timing candidates based on a status of a channel with the first base station or communication environment. For example, the first user equipment may reduce the number of timing candidates when the channel state with the first base station is not in a good condition and may increase the number of timing candidates when the channel state with the first base station is in the good condition. In another example, the first user equipment may increase the number of timing candidates when the channel state with the first base station is not in a good condition and may reduce the number of timing candidates when the channel state with the first base station is in the good condition.

In operation S410, the first user equipment may set 'p' as 1, and in operation S420, the first user equipment may measure and store an indicator of the first interference signal at a p-th timing candidate. In an example embodiment of the inventive concept, the above indicator may include at least one of reference signal received power, a received signal strength indicator, and reference signal received quality.

In operation S430, the first user equipment may determine whether 'p' is equal to 'q', and when operation S430 is 'NO', the first user equipment counts 'p' up (e.g., p=p+1) to proceed to operation S420 again, and when operation S430 is 'YES', the first user equipment may determine the first reception timing of the first interference signal based on the indicator values measured from a plurality of loops in operation S420 to operation S440. In other words, in operation S450, the first user equipment may determine the first reception timing of the first interference signal based on the plurality of indicators.

Referring to FIG. 8B, the first user equipment may divide a timing detection period corresponding to t21 to t22 into q timing candidates. For example, 1, 2, . . . , q−1, and q. A width W of the timing candidate may be suitable for the number of the timing candidates. In an embodiment, the first user equipment may measure a wireless environment indicator (WEI) of the first interference signal at each of the q timing candidates. The first user equipment may determine the first reception timing of the first interference signal based on q values of the WEI measured respectively at q timing candidates. For example, the first user equipment may determine a q−1st timing candidate corresponding to the largest value of WEI as the first reception timing of the first interference signal. As another example, the first user equipment may determine a q−2nd timing candidate corresponding to the second largest value of WEI as the first reception timing of the first interference signal.

FIGS. 9 to 12 are flowcharts for describing a method of determining the first reception timing of the first interference signal according to an embodiment of the present inventive concept. Hereinafter, the method of determining the first reception timing with reference to FIGS. 9 to 12 according to the embodiments of the present inventive concept may be applied to the first to third measurement methods described above. In addition, the measurement result in the present specification may include one of a filter output of the matched filter described above, a measured correlation value, and a measured indicator value.

Figure 9:
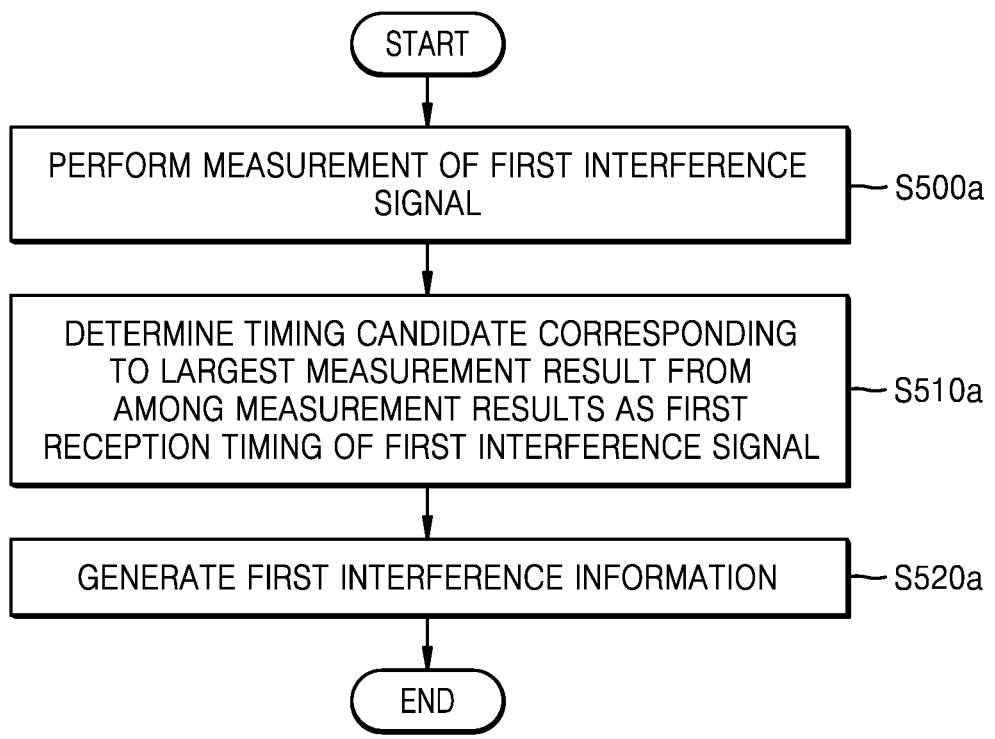
FIGS. 9, 10, 11 and 12 are flowcharts for describing a method of determining a timing of receiving a first interference signal according to an embodiment of the present inventive concept.

Referring to FIG. 9, in operation S500a, the first user equipment may perform the measurement of the first interference signal. The first user equipment may perform the measurement of the first interference signal based on one of the embodiments described above with reference to FIGS. 5A to 8B. For example, when the first interference signal is a sounding reference signal, operation S500a may be performed based on the embodiments described with reference to FIGS. 5A to 7B. In another example, operation S500a may be performed based on the embodiments described above with reference to FIGS. 8A and 8B regardless of the kind of the first interference signal.

In operation S510a, the first user equipment may determine a timing candidate corresponding to the largest measurement result from among the measurement results generated in operation S500a, as the first reception timing of the first interference signal.

In operation S520a, the first user equipment may determine the measurement result having the largest value as a representative value and may generate first interference information including the representative value. In the present specification, the measurement result is a result of measuring a certain indicator and may be referred to as the indicator value, and the representative value may be referred to as a representative indicator value. In other words, the first interference information may be used to notify the first base station of a degree of the first interference signal's influence on the first user equipment. In some embodiments, the first interference information may further include information about the first reception timing of the first interference signal determined in operation S510a.

Figure 10:
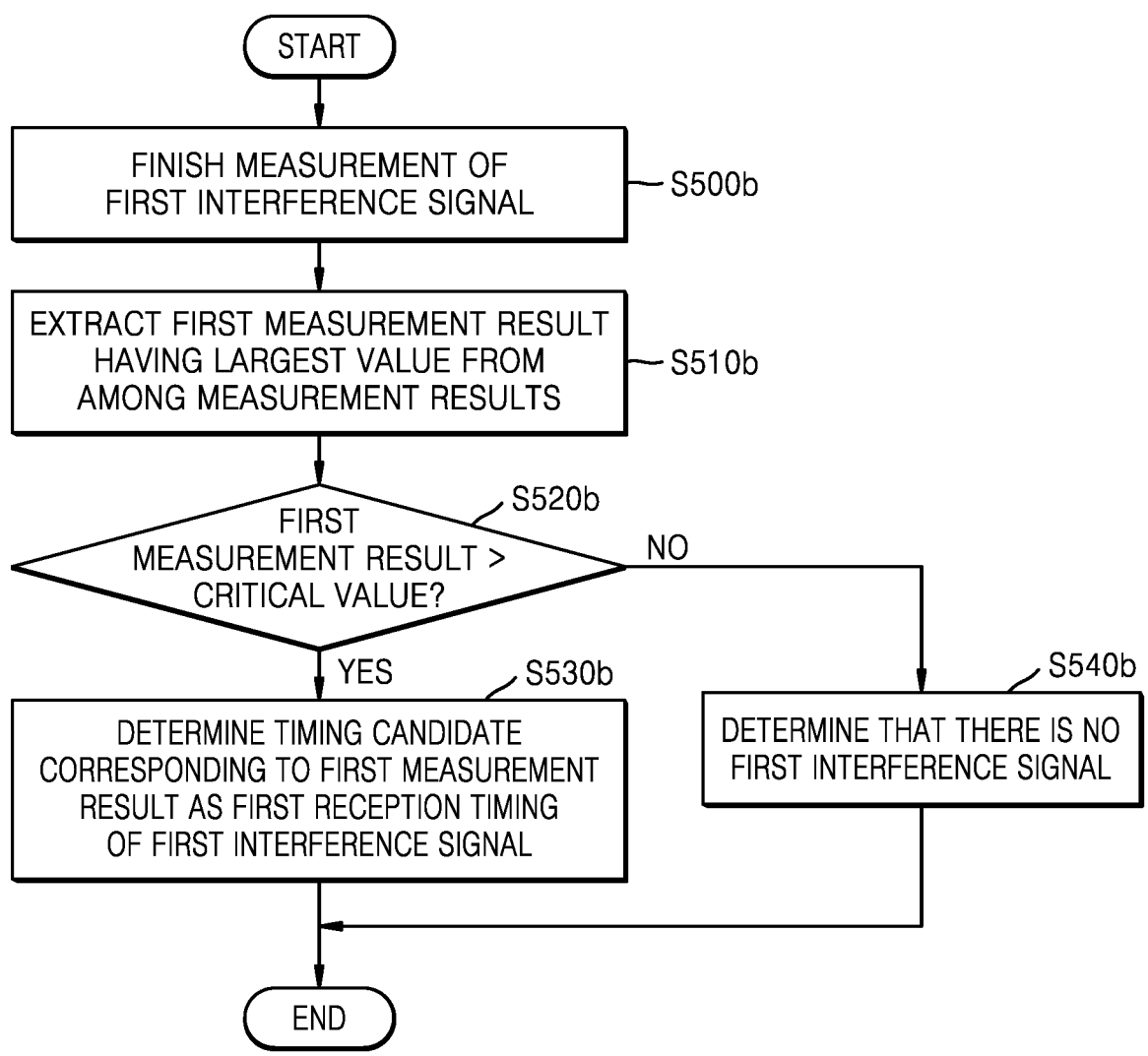

Referring to FIG. 10, in operation S500b, the first user equipment may finish the measurement on the first interference signal. For example, the first user equipment may finish the measurement by measuring certain indicators with respect to the first interference signal at all the timing candidates within the timing detection period.

In operation S510b, the first user equipment may extract a first measurement result having the largest value from among the measurement results generated in operation S500b. In operation S520b, the first user equipment may determine whether the first measurement result exceeds a critical value. When operation S520b is 'YES', in operation S530b, the first user equipment may determine a candidate corresponding to the first measurement result as the first reception timing of the first interference signal. When operation S520b is 'NO', in operation S540b, the first user equipment may determine that there is no first interference signal. Here, the first user equipment may generate first interference information including information indicating that there is no first interference signal and may transmit the first interference information to the first base station.

As shown in FIG. 10, only when the largest measurement result of the first interference signal exceeds the critical value, the first reception timing of the first interference signal is determined, and the measurement result of the first interference signal is transmitted to the first base station to reduce unnecessary consumption of wireless resources.

Figure 11:
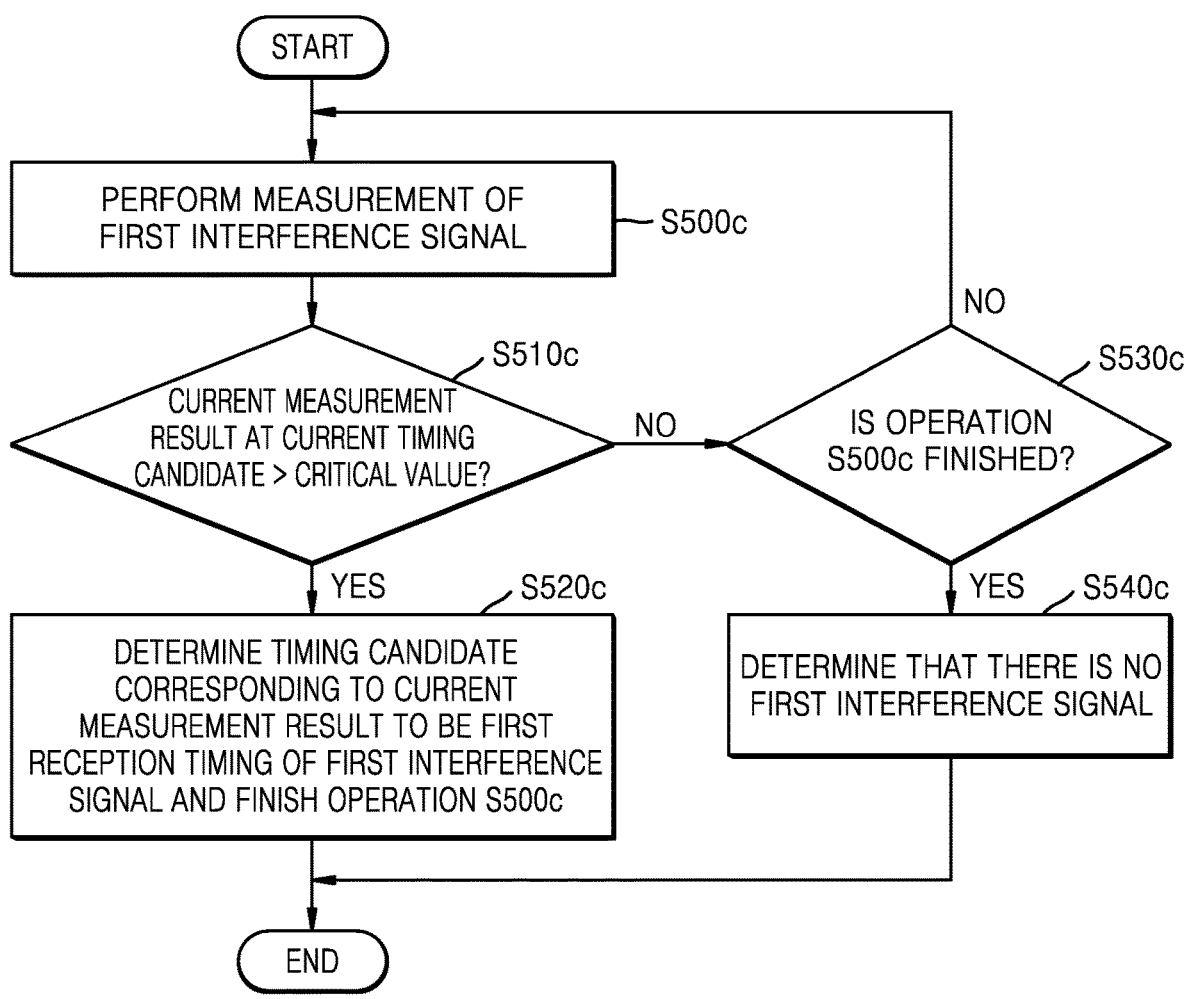

Referring to FIG. 11, in operation S500c, the first user equipment may perform the measurement on the first interference signal. For example, the first user equipment may measure the first interference signal sequentially at the plurality of timing candidates within the timing detection period. However, the first interference signal may be measured at fewer than all of the plurality of timing candidates in the timing detection period. In operation S510c, the first user equipment may monitor whether the current measurement result at the current timing candidate exceeds the critical value in real-time. When operation S510c is 'YES', in the next operation S520c, the first user equipment may determine the timing candidate corresponding to the current measurement result as the first reception timing of the first interference signal, and may finish the measurement in operation S500c. In other words, the measurement of the first interference signal may be terminated. When operation S510c is 'NO', in the next operation S530c, the first user equipment may determine whether operation S500c is finished. When operation S530c is 'NO', the first user equipment continuously performs operation S500c and measures the first interference signal at each of the remaining timing candidates. When operation S530c is 'YES', in next operation S540c, the first user equipment may determine that there is no first interference signal.

As shown in FIG. 11, when the current measurement result of the first interference signal exceeds the critical value, the measurement of the first interference signal is suspended, and the first reception timing of the first interference signal is instantly determined so that unnecessary resource consumption in the first user equipment may be prevented, since components of the first user equipment do not have to measure the first interference signal at the remaining timing candidates.

Figure 12:
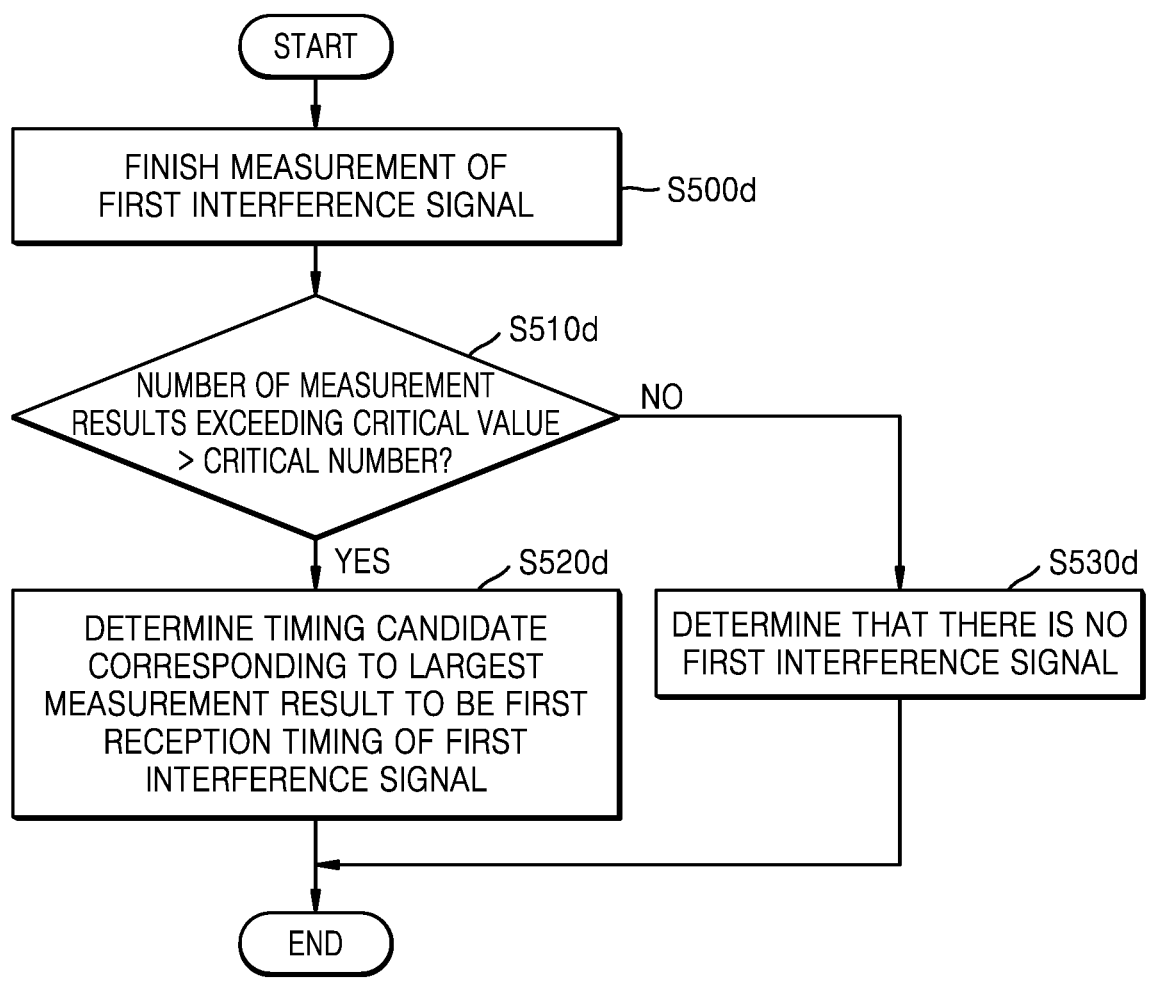

Referring to FIG. 12, in operation S500d, the first user equipment may finish the measurement on the first interference signal. For example, the first user equipment may finish the measurement by measuring certain indicators with respect to the first interference signal at all the timing candidates within the timing detection period.

In operation S510d, the first user equipment may determine whether the number of measurement results exceeding the critical value from among the measurement results generated in operation S500d exceeds the critical number. When operation S510d is 'YES', in next operation S520d, the first user equipment may determine the timing candidate corresponding to the measurement result having the largest value from among the measurement results as the first reception timing of the first interference signal. When operation S510d is 'NO', in next operation S530d, the first user equipment may determine there is no first interference signal.

As shown in FIG. 12, because there may be an error in the measurement of the interference signal according to the channel status or communication environment, the first user equipment uses the critical number considering the error, and thus, an exact measurement operation of the first interference signal may be performed.

Figure 13:
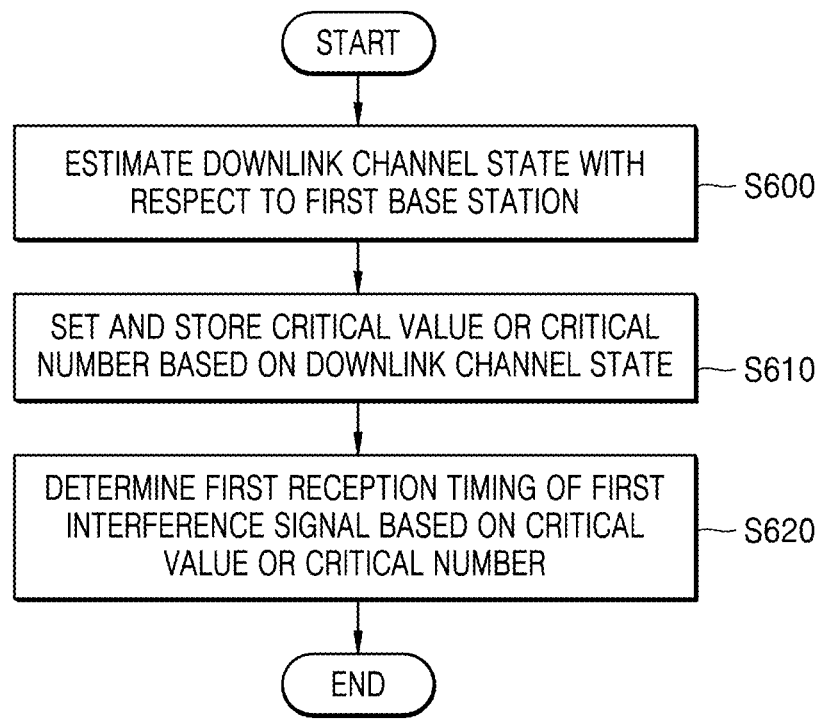
FIGS. 13 and 14 are flowcharts for describing a method of setting a critical value or a critical coefficient of first user equipment according to an embodiment of the present inventive concept.
Figure 14:
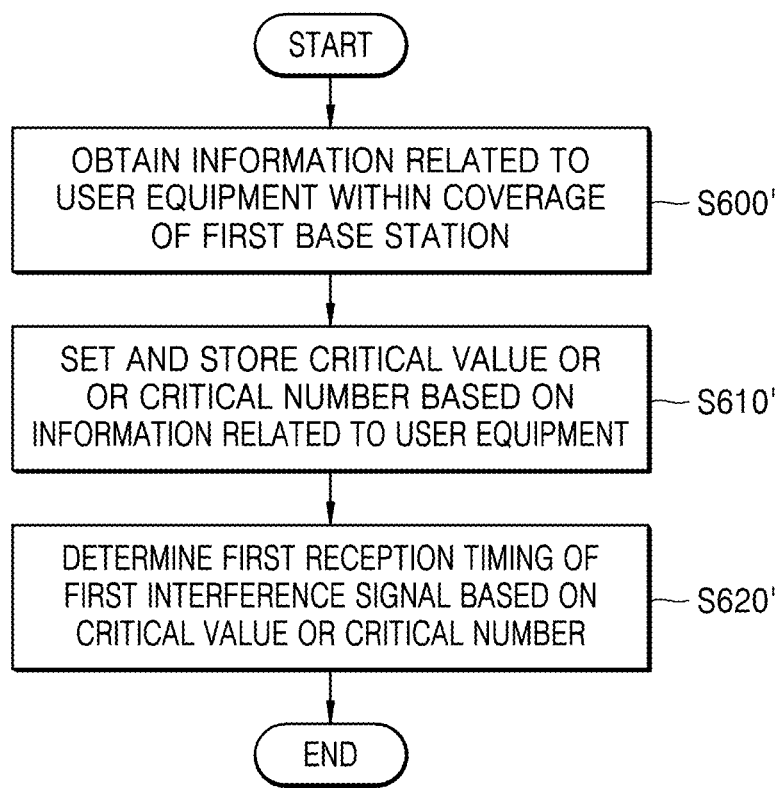

FIGS. 13 and 14 are flowcharts for describing a method of setting a critical value or a critical coefficient of a first user equipment according to an embodiment of the present inventive concept.

Referring to FIG. 13, in operation S600, the first user equipment may estimate a downlink channel state with respect to the first base station. In other words, the first user equipment may estimate the status of a downlink channel with respect to the first base station. In an embodiment of the inventive concept, the first user equipment may estimate the downlink channel state on the basis of a reference signal or a pilot signal transmitted from the first base station for estimating the downlink channel.

In operation S610, the first user equipment may set and store the critical value (e.g., the critical value in FIGS. 10 and 11) or the critical number (e.g., critical number of FIG. 12) based on the downlink channel state. In an embodiment of the inventive concept, the first user equipment may increase the critical value or reduce the critical number when the downlink channel state is in good condition and may reduce the critical value or increase the critical number when the downlink channel state is in bad condition. However, one or more embodiments of the inventive concept are not limited to the above example, in other words, the first user equipment may reduce the critical value or increase the critical number when the downlink channel state is in good condition and may increase the critical value or reduce the critical number when the downlink channel state is in bad condition.

In operation S620, the first user equipment may determine the first reception timing of the first interference signal based on the critical value or the critical number stored in operation S610. This is described in detail above with reference to FIGS. 10 to 12, and thus, detailed descriptions thereof are omitted.

Referring to FIG. 14, in operation S600', the first user equipment may obtain information related to the user equipment that is in the coverage area of the first base station. In an embodiment of the inventive concept, the first base station may transmit the user equipment-related information indicating how easy it may be to change its own downlink scheduling assignment, such as the number of user equipment within its coverage, to the first user equipment through a procedure such as an RRC signaling. For example, as the number of user equipment within the coverage of the first base station increases, it may not be easy to change the downlink scheduling assignment, and the first user equipment may identify the status of the first base station through the user equipment-related information.

In operation S610', the first user equipment may set and store the critical value (e.g., the critical value in FIGS. 10 and 11) or the critical number (e.g., the critical number of FIG. 12) based on the user equipment-related information. In an embodiment of the inventive concept, the first user equipment may increase the critical value or reduce the critical number as the number of the user equipment within the coverage area of the first base station increases and may reduce the critical value or increase the critical number as the number of user equipment within the coverage area of the first base station is reduced. However, one or more embodiments of the inventive concept are not limited thereto, in other words, the first user equipment may reduce the critical value or increase the critical number as the number of the user equipment within the coverage area of the first base station increases and may increase the critical value or reduce the critical number as the number of user equipment within the coverage area of the first base station is reduced.

In operation S620', the first user equipment may determine the first reception timing of the first interference signal based on the critical value or the critical number stored in operation S610'. This is described in detail above with reference to FIGS. 10 to 12, and thus, detailed descriptions thereof are omitted.

Figure 15B:
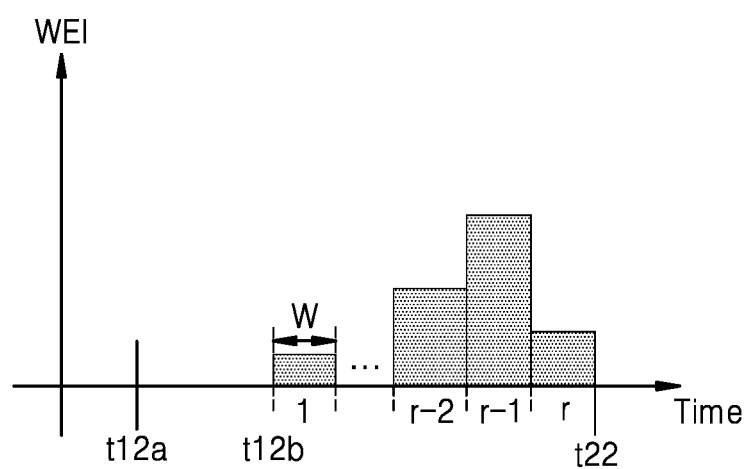
FIGS. 15B and 15C are timing diagrams for describing operations of the first user equipment of FIG. 15A in detail.
Figure 15C:
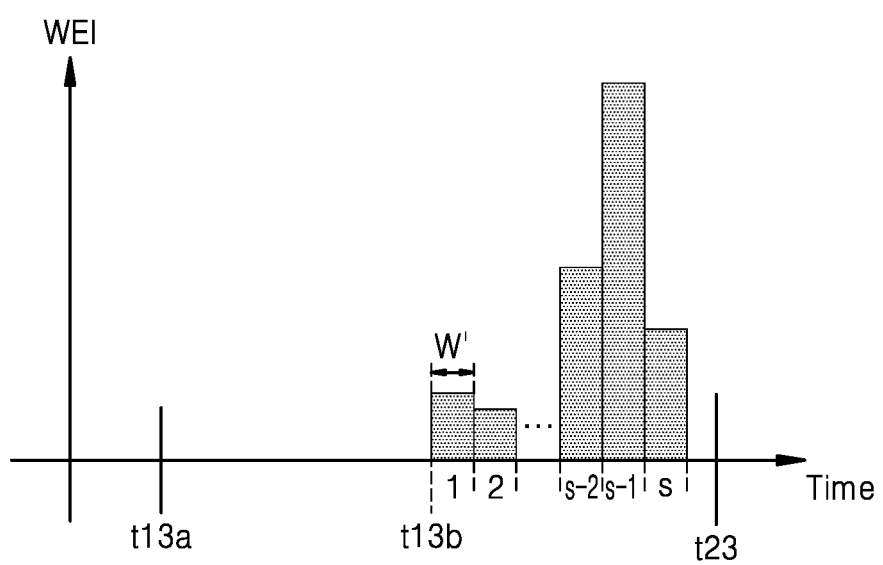

FIG. 15A is a flowchart for describing a method of operating a first user equipment according to an embodiment of the present inventive concept, and FIGS. 15B and 15C are timing diagrams for describing operations of the first user equipment of FIG. 15A in detail.

Referring to FIG. 15A, in operation S700, the first base station 400 may transmit a second downlink signal to the first user equipment 420. In the present specification, the second downlink signal is a signal that is transmitted from the first base station 400 to the first user equipment 420 after the first reception timing with respect to the first interference signal is determined as shown in FIG. 4, etc., and the downlink scheduling assignment method of the second downlink signal may be the same as or different from the downlink scheduling assignment method of the first downlink signal. In operation S710, the second user equipment 430 may transmit the second uplink signal to the second base station 410. Here, the first user equipment 420 may receive a second uplink signal of the second user equipment 430 as a second interference signal with respect to the second downlink signal. In other words, the second uplink signal may interfere with the second downlink signal. In the present specification, the first uplink signal may be a signal that is transmitted from the second user equipment 430 to the second base station 410 after the first reception timing with respect to the first interference signal is determined as shown in FIG. 4, etc.

In operation S720, the first user equipment 420 may obtain reference information including the first reception timing of the first interference signal from the memory in the first user equipment 420. In operation S730, the first user equipment 420 may determine a second reception timing of the second interference signal based on the reference information. In an embodiment of the inventive concept, the first user equipment 420 may set, based on the reference information, at least one of a width of each of the plurality of timing candidates with respect to the second interference signal, the number of the plurality of candidates, and positions of the plurality of timing candidates within the timing detection period with respect to the second interference signal. The first user equipment 420 may measure the second interference signal at each of the plurality of set timing candidates and determine the second reception timing of the second interference signal based on the measurement results. In some embodiments, the first user equipment 420 may perform the measurement of a third interference signal that is received after the second interference signal based on the second reception timing. In operation S740, the first user equipment 420 may generate second interference information by using the plurality of measurement results generated in operation S730. In some embodiments, the second interference information may include information about the second reception timing determined in operation S730. In operation S750, the first user equipment 420 may transmit the second interference information to the first base station 400.

Referring to FIG. 15B, the first user equipment 420 may divide the second timing detection period with respect to the second interference signal, corresponding to a section from t12a to t22, r timing candidates (r is 1 or greater integer) starting from t12b, based on the first reception timing of the first interference signal. In an embodiment of the inventive concept, the first user equipment 420 may divide the second timing detection period so that the timing candidates may be positioned within a timing domain similar to the first reception timing of the first interference signal. For example, in FIG. 8B, when it is assumed that a q−1st timing candidate is determined as the first reception timing of the first interference signal, the first user equipment 420 may divide, based on the reference information representing the above, the second timing detection period so that r timing candidates may be positioned in a time domain similar to that of the q−1st timing candidate in FIG. 8B. In addition, the first user equipment 420 may divide the second timing detection period into timing candidates having the same width W as that of FIG. 8B.

Referring to FIG. 15C, the first user equipment 420 may divide the second timing detection period with respect to the second interference signal, corresponding to a section from t13a to t23, s timing candidates (s is 1 or greater integer) starting from t13b, based on the first reception timing of the first interference signal. As compared with FIG. 15B, the first user equipment 420 may divide the second timing detection period into timing candidates having a width W' that is different from FIG. 8B. For example, the width W' may be smaller than the width W.

In an embodiment of the inventive concept, the first user equipment 420 may set the width W or W' based on the channel condition, communication environment, etc. For example, the first user equipment may set the width W or W' to be increased as the channel status (or state) with the first base station is not in good condition and may set the width W or W' to be reduced as the channel status (or state) with the first base station is in good condition. In another example, the first user equipment may set the width W or W' to be reduced as the channel status (or state) with the first base station is not in good condition and may set the width W or W' to be increased as the channel status (or state) with the first base station is in good condition.

Figure 16:
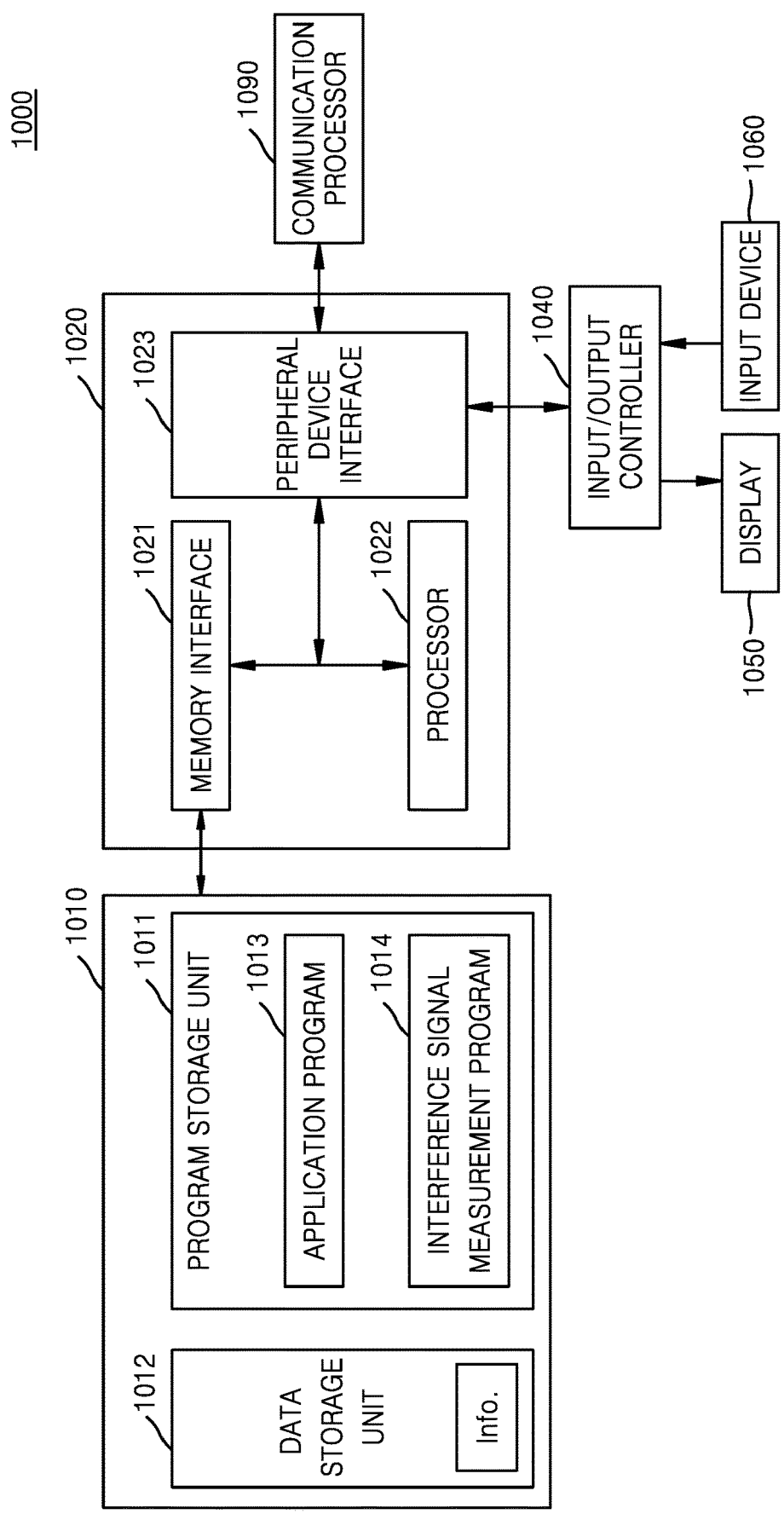
FIG. 16 is a block diagram of an electronic device according to an embodiment of the inventive concept.

FIG. 16 is a block diagram of an electronic device 1000 according to an embodiment of the inventive concept. The electronic device 1000 may be the user equipment according to the embodiment of the inventive concept.

Referring to FIG. 16, the electronic device 1000 may include a memory 1010, a processor unit 1020, an input/output controller 1040, a display 1050, an input device 1060, and a communication processor 1090. Here, a plurality of memories 1010 may be provided. Each of the components will be described below.

The memory 1010 may include a program storage unit 1011 which stores a program for controlling operations of the electronic device 1000, and a data storage unit 1012 which stores data generated during execution of the program. The data storage unit 1012 may store data required to operate an application program 1013 and an interference signal measurement program 1014 or may store data generated due to operations of the application program 1013 and the interference signal measurement program 1014. The data storage unit 1012 may store information (Info.) including at least one of the uplink information, reference information, and the interference information according to the embodiments of the inventive concept.

The program storage unit 1011 may include the application program 1013 and the interference signal measurement program 1014. Here, the program included in the program storage unit 1011 is a group of instructions and may be referred to as an instruction set. The application program 1013 may include program codes for executing various applications operating on the electronic device 1000. In other words, the application program 1013 may include codes (or commands) regarding various applications driven by a processor 1022 of the processor unit 1020. The interference signal measurement program 1014 may include codes (or commands) for determining the reception timing of the interference signal and performing the measurement of the interference signal received later based on the determined reception timing, according to the embodiments of the inventive concept.

In an embodiment of the inventive concept, the processor 1022 may determine the reception timing of the interference signal by using one of the first to third measurement methods described above by executing the interference signal measurement program 1014, and may perform the measurement of the interference signal received later based on the determined reception timing.

In addition, the electronic device 1000 may include the communication processor 1090 performing the communication function for voice communication and data communication. A peripheral device interface 1023 may control connections among the input/output controller 1040, the communication processor 1090, the processor 1022, and the memory interface 1021. The processor 1022 may control the plurality of base stations to provide corresponding service by using at least one software program. Here, the processor 1022 may execute at least one program stored in the memory 1010 and may provide the service corresponding to the program.

The input/output controller 1040 may provide an interface between the input/output devices such as the display 105 and the input device 1060, and the peripheral device interface 1023. The display 1050 may display status information, input characters, moving pictures, still images, etc. For example, the display 1050 may display application program information driven by the processor 1022.

The input device 1060 may provide the processor unit 1020 with input data generated due to the selection of the electronic device through the input/output controller 1040. Here, the input device 1060 may include a keypad including at least one hardware button, a touch pad sensing touch information, etc. For example, the input device 1060 may provide the processor 1022 with touch information such as touch, touch movement, touch release, etc. sensed through the touch pad, via the input/output controller 1040.

Figure 17:
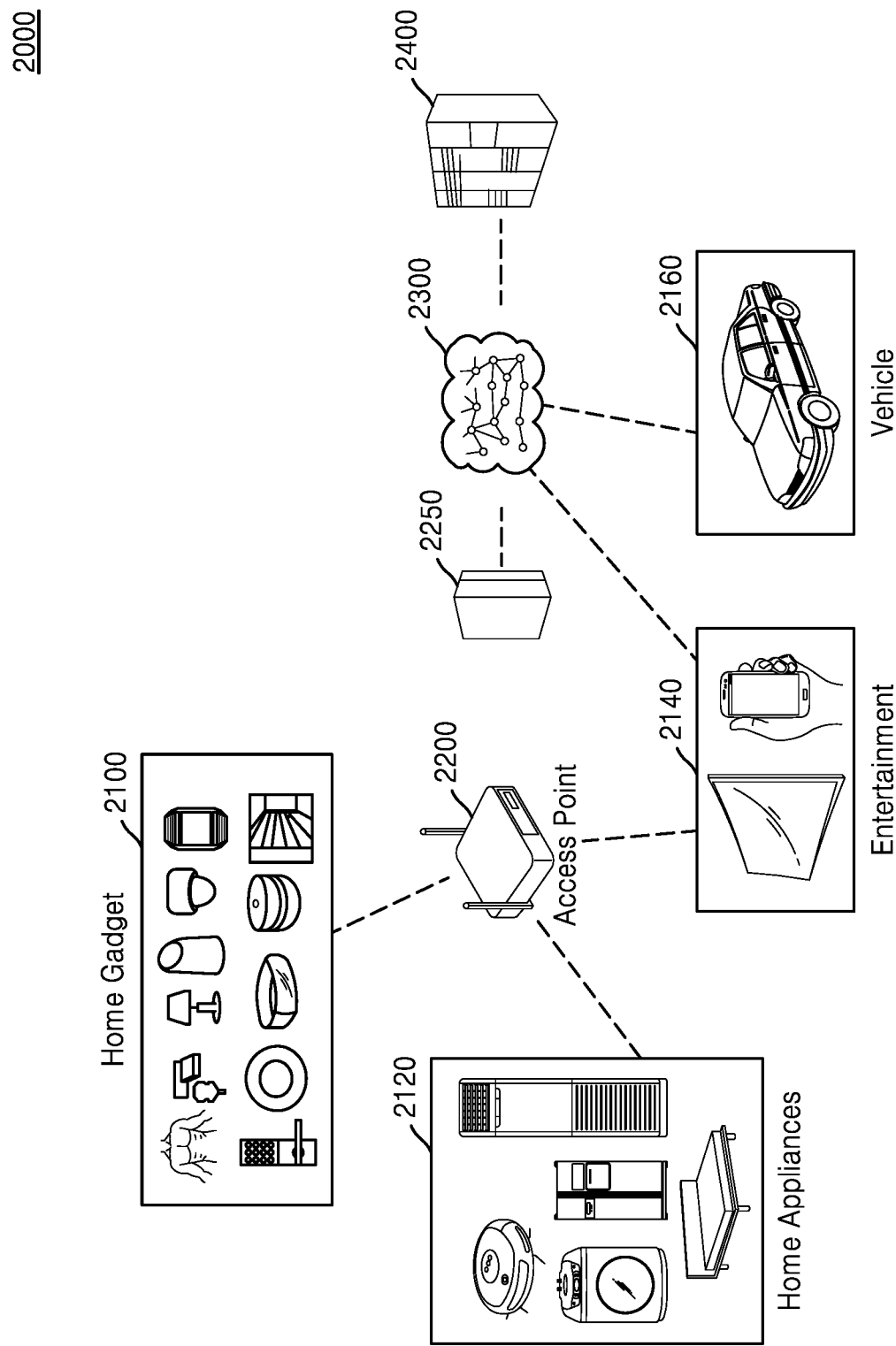
FIG. 17 is a diagram of an Internet of things (IoT) network system to which an embodiment of the inventive concept is applied.

FIG. 17 is a diagram of an internet of things (IoT) network system 2000 to which an embodiment of the present inventive concept is applied.

Referring to FIG. 17, the IoT network system 2000 may include a plurality of IoT devices 2100, 2120, 2140, and 2160, an access point (AP) 2200, a gateway 2250, a wireless network 2300, and a server 2400. The IoT may denote a network among objects using wired/wireless communication.

The IoT devices 2100, 2120, 2140, and 2160 may form a group according to characteristics of the IoT devices. For example, the IoT devices may be grouped as a home gadget group 2100, an electronic appliance/furniture group 2120, an entertainment group 2140, or a vehicle group 2160. The plurality of IoT devices 2100, 2120, and 2140 may be connected to a communication network or another IoT device via the AP 2200. The AP 2200 may be built in one IoT device. The gateway 2250 may change a protocol so that the AP 2200 is connected to an external wireless network. The IoT devices 2100, 2120, and 2140 may be connected to the outer communication network via the gateway 2250. The wireless network 2300 may include the Internet and/or a public network. The plurality of IoT devices 2100, 2120, 2140, and 2160 may be connected to the server 2400 providing certain service via the wireless network 2300, and a user may utilize the service through at least one of the plurality of IoT devices 2100, 2120, 2140, and 2160. The plurality of IoT devices 2100, 2120, 2140, and 2160 may each determine the reception timing of the interference signal according to the embodiments of the inventive concept and may perform the measurement of the interference signal that is received later based on the determined reception timing.

While the inventive concept has been particularly shown and described with reference to embodiments thereof, it will be understood that various changes in form and details may be made thereto without departing from the spirit and scope of the inventive concept as set forth in the following claims.

What is claimed is:

1. User equipment for communicating with a first base station, the user equipment comprising:
a radio frequency (RF) transceiver;
a processing circuit configured to process a signal received through the RF transceiver or a signal to be transmitted through the RF transceiver; and
a controller configured to determine a first reception timing of a first interference signal, and measure, based on the first reception timing, a second interference signal that is received after the first interference signal,
wherein the first interference signal and the second interference signal are received from one adjacent user equipment communicating with a second base station, and
wherein the controller is configured to set a coefficient of a matched filter based on information about the first interference signal, and determine the first reception timing, based on a filter output that is generated by passing the first interference signal through the set matched filter.

2. The user equipment of claim 1, wherein the first interference signal includes a sounding reference signal, and
the information about the first interference signal includes an identification of the sounding reference signal and position information of the sounding reference signal in a frequency domain.

3. The user equipment of claim 1, wherein the first interference signal includes a sounding reference signal, and
the controller is configured to measure a correlation value of each pair of a plurality of timing candidates corresponding to the first interference signal, and determine the first reception timing, based on the measured correlation values.

4. The user equipment of claim 1, wherein the controller is configured to divide a timing detection period into a plurality of timing candidates, measure an indicator value of the first interference signal at each of the plurality of timing candidates, and determine the first reception timing, based on the measured indicator values.

5. The user equipment of claim 4, wherein an indicator of the first interference signal includes reference signal received power, a received signal strength indicator, and reference signal received quality.

6. The user equipment of claim 4, wherein a starting point of the timing detection period is determined by the first base station.

7. The user equipment of claim 4, wherein a width of each of the plurality of timing candidates corresponds to a signal measurement performance of the controller or a signal measurement method of the controller.

8. The user equipment of claim 1, wherein the controller is configured to determine the first reception timing, based on measurement results that are generated by measuring the first interference signal at each of a plurality of timing candidates.

9. The user equipment of claim 8, wherein a first timing candidate corresponding to a first measurement result having a largest value from among the measurement results is determined to be the first reception timing.

10. The user equipment of claim 8, wherein a first timing candidate, which corresponds to a first measurement result that has a largest value from among the measurement results and exceeds a critical value, is determined to be the first reception timing.

11. The user equipment of claim 8, wherein, when the number of first measurement results having values exceeding a critical value from among the measurement results exceeds a critical number, a second timing candidate corresponding to a second measurement result having a largest value from among the first measurement results is determined to be the first reception timing.

12. The user equipment of claim 1, wherein the controller is configured to set, based on the first reception timing, a width of each of a plurality of timing candidates with respect to the second interference signal, the number of timing candidates, or positions of the plurality of timing candidates within a timing detection period with respect to the second interference signal, and perform a measurement of the second interference signal at each of the plurality of timing candidates.

13. User equipment for communicating with a first base station, the user equipment comprising:
- a radio frequency (RF) transceiver;
- a processing circuit configured to process a signal received through the RF transceiver or a signal to be transmitted through the RF transceiver; and
- a controller configured to determine a first reception timing of a first interference signal, and measure, based on the first reception timing, a second interference signal that is received after the first interference signal,
- wherein the first interference signal and the second interference signal are received from one adjacent user equipment communicating with a second base station,
- wherein the first interference signal includes a sounding reference signal, and
- wherein the controller is configured to measure a correlation value of each pair of a plurality of timing candidates corresponding to the first interference signal, and determine the first reception timing, based on the measured correlation values.

14. User equipment for communicating with a first base station, the user equipment comprising:
- a radio frequency (RF) transceiver;
- a processing circuit configured to process a signal received through the RF transceiver or a signal to be transmitted through the RF transceiver; and
- a controller configured to determine a first reception timing of a first interference signal, and measure, based on the first reception timing, a second interference signal that is received after the first interference signal,
- wherein the first interference signal and the second interference signal are received from one adjacent user equipment communicating with a second base station, and
- wherein the controller is configured to divide a timing detection period into a plurality of timing candidates, measure an indicator value of the first interference signal at each of the plurality of timing candidates, and determine the first reception timing, based on the measured indicator values.

\* \* \* \* \*